(12) United States Patent
Katogi

(10) Patent No.: US 9,223,731 B2
(45) Date of Patent: Dec. 29, 2015

(54) ARBITRATION CIRCUIT AND CONTROL METHOD THEREOF

(75) Inventor: So Katogi, Tokyo (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/200,930

(22) Filed: Oct. 5, 2011

(65) Prior Publication Data

US 2012/0117288 A1 May 10, 2012

(30) Foreign Application Priority Data

Nov. 8, 2010 (JP) ................................. 2010-249253

(51) Int. Cl.
*G06F 13/364* (2006.01)

(52) U.S. Cl.
CPC .................................... *G06F 13/364* (2013.01)

(58) Field of Classification Search
USPC .......................... 710/114, 240–244, 200, 260
See application file for complete search history.

(56) References Cited

U.S. PATENT DOCUMENTS

| | | | |
|---|---|---|---|
| 5,034,881 A * | 7/1991 | Hoashi et al. ................. | 710/123 |
| 5,590,380 A * | 12/1996 | Yamada et al. ................. | 710/48 |
| 5,621,897 A * | 4/1997 | Boury et al. ................... | 710/116 |
| 7,051,133 B2 * | 5/2006 | Takata ............................ | 710/111 |
| 8,527,682 B2 * | 9/2013 | Ootaki et al. .................. | 710/107 |
| 2004/0210694 A1 * | 10/2004 | Shenderovich ............... | 710/113 |
| 2007/0271405 A1 * | 11/2007 | Moore ........................... | 710/309 |
| 2010/0115167 A1 * | 5/2010 | Tardieux et al. .............. | 710/240 |

FOREIGN PATENT DOCUMENTS

| | | |
|---|---|---|
| JP | 08-123634 | 5/1996 |
| JP | 2000-132505 | * 5/2000 |

* cited by examiner

*Primary Examiner* — Glenn A Auve
*Assistant Examiner* — Kim T. Huynh
(74) *Attorney, Agent, or Firm* — Sony Corporation

(57) ABSTRACT

An arbitration circuit includes a use frequency setting block that sets a setting value for limiting a bus use frequency for each of a plurality of masters. A use request management section holds the bus use request from each of the plurality of masters and selects a use request that has not been granted from among the held use requests. A use frequency limitation block limits the use request selected by the use request management section such that the bus use frequency of each of the plurality of masters will not exceed its setting value. A use request grant block grants a use request of any one of the plurality of masters from among use requests not limited by the use frequency limitation block received from the plurality of masters.

14 Claims, 29 Drawing Sheets

FIG.5

|  | MASTER #1 | MASTER #2 | MASTER #3 | ... | MASTER #M |
|---|---|---|---|---|---|
| CYCLE PERIOD | 5 | 4 | 4 | ... | 6 |
| MAXIMUM GRANT COUNT | 4 | 2 | 2 | ... | 4 |

FIG.6

|  | MASTER #1 | MASTER #2 | MASTER #3 | ... | MASTER #M |
|---|---|---|---|---|---|
| PRIORITY | 0 | 2 | 1 | ... | M |

FIG.11

| | T0 | T1 | T2 | T3 | T4 | T5 |
|---|---|---|---|---|---|---|
| CLOCK | | | | | | |
| REQUEST INPUT | 3'b111 | 3'b110 | 3'b100 | 3'b100 | 3'b100 | 3'b000 |
| #1 COUNTER VALUE (422) | 1 | 1 | 1 | 1 | 1 | 1 |
| #2 COUNTER VALUE (422) | 1 | 2 | 2 | 2 | 2 | 2 |
| #3 COUNTER VALUE (422) | 1 | 1 | 1 | 1 | 1 | 0 |
| REQUEST MANAGEMENT SECTION OUTPUT (420) | 3'b111 | 3'b111 | 3'b111 | 3'b111 | 3'b111 | 3'b110 |
| BANDPASS FILTER OUTPUT (430) | 3'b111 | 3'b111 | 3'b111 | 3'b111 | 3'b011 | 3'b110 |
| VARIABLE PRIORITY FILTER OUTPUT (440) | 3'b100 | 3'b100 | 3'b100 | 3'b100 | 3'b001 | 3'b100 |

FIG.18

| | T0 | T1 | T2 | T3 | T4 | T5 |
|---|---|---|---|---|---|---|
| CLOCK | | | | | | |
| REQUEST INPUT | 3'b111 | 3'b110 | 3'b100 | 3'b100 | 3'b100 | 3'b000 |
| #1 COUNTER VALUE (422) | 1 | 1 | 2 | 1 | 1 | 2 |
| #2 COUNTER VALUE (422) | 1 | 2 | 1 | 1 | 1 | 1 |
| #3 COUNTER VALUE (422) | 1 | 1 | 1 | 1 | 1 | 0 |
| REQUEST MANAGEMENT SECTION OUTPUT (420) | 3'b111 | 3'b111 | 3'b111 | 3'b111 | 3'b111 | 3'b110 |
| BANDPASS FILTER OUTPUT (430) | 3'b111 | 3'b111 | 3'b111 | 3'b111 | 3'b011 | 3'b110 |
| LRG FILTER OUTPUT (440) | 3'b100 | 3'b010 | 3'b100 | 3'b100 | 3'b001 | 3'b010 |

FIG.21

|  | MASTER #1 | MASTER #2 | MASTER #3 | ... | MASTER #M |
|---|---|---|---|---|---|
| PRIORITY | 0 | 1 | 1 | ... | M |

FIG.23

| | T0 | T1 | T2 | T3 | T4 | T5 |
|---|---|---|---|---|---|---|
| CLOCK | | | | | | |
| REQUEST INPUT | 3'b111 | 3'b110 | 3'b100 | 3'b100 | 3'b100 | 3'b000 |
| #1 COUNTER VALUE (422) | 1 | 1 | 1 | 1 | 1 | 1 |
| #2 COUNTER VALUE (422) | 1 | 2 | 2 | 2 | 2 | 1 |
| #3 COUNTER VALUE (422) | 1 | 1 | 1 | 1 | 1 | 1 |
| REQUEST MANAGEMENT SECTION OUTPUT (420) | 3'b111 | 3'b111 | 3'b111 | 3'b111 | 3'b111 | 3'b111 |
| BANDPASS FILTER OUTPUT (430) | 3'b111 | 3'b111 | 3'b111 | 3'b111 | 3'b011 | 3'b111 |
| VARIABLE PRIORITY FILTER OUTPUT (440) | 3'b100 | 3'b100 | 3'b100 | 3'b100 | 3'b011 | 3'b100 |
| LRG FILTER OUTPUT (450) | 3'b100 | 3'b100 | 3'b100 | 3'b100 | 3'b010 | 3'b100 |

FIG.28

| | T0 | T1 | T2 | T3 | T4 | T5 |
|---|---|---|---|---|---|---|
| CLOCK | | | | | | |
| REQUEST INPUT | 3'b111 | 3'b110 | 3'b100 | 3'b100 | 3'b100 | 3'b000 |
| #1 COUNTER VALUE (422) | 1 | 2 | 2 | 3 | 3 | 3 |
| #2 COUNTER VALUE (422) | 1 | 2 | 2 | 2 | 2 | 2 |
| #3 COUNTER VALUE (422) | 1 | 1 | 1 | 1 | 1 | 1 |
| REQUEST MANAGEMENT SECTION OUTPUT (420) | 3'b111 | 3'b111 | 3'b111 | 3'b111 | 3'b111 | 3'b111 |
| BANDPASS FILTER OUTPUT (430) | 3'b111 | 3'b111 | 3'b111 | 3'b111 | 3'b011 | 3'b111 |
| VARIABLE PRIORITY FILTER OUTPUT (440) | 3'b100 | 3'b100 | 3'b100 | 3'b100 | 3'b011 | 3'b011 |
| SLICER OUTPUT (460) | 3'b000 | 3'b100 | 3'b000 | 3'b100 | 3'b000 | 3'b011 |
| LRG FILTER OUTPUT (450) | 3'b000 | 3'b100 | 3'b000 | 3'b100 | 3'b000 | 3'b010 |

|  | MASTER #1 | MASTER #2 | MASTER #3 | ... | MASTER #M |
|---|---|---|---|---|---|
| GRANT INTERVAL | 2 | 1 | 0 | ... | 3 |

ARBITRATION CIRCUIT AND CONTROL METHOD THEREOF

BACKGROUND

The present disclosure relates to an arbitration circuit and, more particularly, to an arbitration circuit configured to optimize bus control between master and slave and to a method of controlling the arbitration circuit.

With complicated and large scale semiconductor integrated circuits based on design techniques such as SoC (System on a Chip) for integrating various types of semiconductor chips into one, two or more devices may be connected to one device via a bus, these two or more devices are configured to control the connected device. In what follows, the devices to be controlled are referred to slaves and the devices that control others are referred to as masters. The masters may include a CPU (Central Processing Unit), a DMAC (Direct Memory Access Controller), a GPU (Graphics Processing Unit), and so on. The slaves may include a memory controller, an interface port, a video memory, and so on.

In the case where there are two or more masters for a slave, an arbitration circuit is arranged, in which each master transmits a request signal to the arbitration circuit for requesting the use of a bus over which data is transmitted. In order to prevent bus contention caused by the masters and optimize bus control, the arbitration circuit arbitrates the requests from the masters. Next, the arbitration circuit transmits a grant signal to a master selected by the bus arbitration, thereby granting the request for the bus.

The arbitration circuit executes bus arbitration in various ways. For example, there are fixed priority method in which the priority levels between masters in the use of bus are determined in advance and a round-robin method in which the masters are equally handled to grant requests sequentially.

In addition, there are a method obtained by combining the fixed priority level and the round-robin method and a method in which the bus occupancy of each master is determined in advance. The bus occupancy herein denotes a bus occupancy time and the number of transfer words that are necessary for one data processing operation.

The employment of the methods mentioned above for example depends on application programs for use in the control of slaves by a master. However, in the development stage of hardware, no specific use cases are established, so that it is often unclear what kinds of application programs will be executed. This makes it difficult to optimize the operations of the arbitration circuit for executing bus control operations in the initial stage of development. Besides, optimum bus control may differ from one use case to another, thereby present problems that bus control is found to have not been optimized and contention is caused between bus uses after the completion of the hardware design of the arbitration circuit. If any of these problems emerges on any of actual bus arbitration circuits, hardware redo must be done to increase the cost.

In order to circumvent above-mentioned problems, a circuit was proposed in which a priority register to which the priority of each master is set is arranged to change the priorities of the masters by rewriting the preset priority levels without doing hardware redesign (refer to Japanese Patent Laid-open No. Hei 8-123634 for example). According to this proposed technology, bus control can be optimized without redesigning the hardware if the priority levels of masters have been changed owning to the changes of application specifications for example.

In the case where the bus occupancy of each master is determined in advance, an apparatus was proposed in which the bus occupancy of each data processing operation is stored, in storage means, for each master to change the bus occupancies by rewriting this storage means (refer to Japanese Patent Laid-open No. 2000-132505 for example). With such an apparatus, a fixed priority level is preset for each master. If, while a master having a lower priority level is occupying the bus, a master having a higher priority level than that of the bus occupying master requests data transfer, the proposed apparatus can grant bus control to the master having the higher priority level. According to this proposed technology, bus control can be optimized without redesigning the hardware if the priority levels of masters have been changed owning to the changes of application specifications for example.

SUMMARY

However, it is possible for the above-mentioned related-art technologies not to be capable of optimizing bus control without redesigning the hardware if the QoS (Quality of Service) of each master is changed. To be more specific, if different masters are required for different QoSs, the data transfer rate of each master must be limited to a band in accordance with the QoS of each master. The above-mentioned related-art technologies can change priority levels on a master basis and set bus occupancy time per data processing operation on a master basis. However, because the above-mentioned related-art technologies do not limit the frequency of bus use, the above-mentioned related-art technologies cannot limit the transfer rate based on the bus use frequency to within the band on a master basis. To be more specific, if the band of each master is changed due to the change in QoS for example, the above-mentioned related-art technologies are required to redesign the hardware.

Therefore, the present disclosure addresses the above-identified and other problems associated with related-art methods and apparatuses and solves the addressed problems by providing an arbitration circuit and a method of controlling the arbitration circuit that are configured to optimize the bus control between master and slave without changing the hardware if the band of each master is changed.

In carrying out the disclosure and according to a first mode thereof, there is provided an arbitration circuit and a control method for this arbitration circuit. This arbitration circuit has a use frequency setting block configured to set a setting value for limiting a bus use frequency of each of masters for each of masters; a use request management section configured to hold the bus use request from each of masters and select a use request not granted from among the held use requests; a use frequency limitation block configured to limit, for each of masters, the use request selected by the use request management section such that the bus use frequency of each of masters will not exceed the setting value set to each of masters; and a use request grant block configured to grant a use request of any one of masters from among use requests not limited by the use frequency limitation block received from masters. This novel configuration brings about an advantage of limiting the bus use frequency for each of masters.

In the first mode of the disclosure, in the above-mentioned arbitration circuit, by setting a priority level of the bus use for each of masters in advance, the use request grant block grants a use request of the master having the highest priority level from among the use requests. This configuration brings about an advantage of granting a use request on the basis of predetermined priority levels.

In the first mode of the disclosure, the above-mentioned mentioned arbitration circuit further has a priority setting block configured to set a priority level of the bus use for each of masters, wherein the use request grant block selects a use request of a master having the highest priority level set by the priority setting block from among the use requests. This configuration brings about an advantage of granting a use request on the basis of predetermined priority levels by setting a priority level for each master in advance.

In the first mode of the disclosure, in the above-mentioned arbitration circuit, the use request grant block selects a use request of a master having the longest elapsed time from the granting by the use request grant block from among the use requests. This configuration brings about an advantage of granting a use request on the basis of an elapsed time from the granting done last time.

In the first mode of the disclosure, in the above-mentioned arbitration circuit, the use request grant block has a priority selection block configured to select a use request of a master having the highest priority level from among the use requests by setting a priority level of the bus use for each of masters in advance; and a longest elapsed time selection block configured to grant a use request of a master having the longest elapsed time from the grant by the longest elapsed time selection block from among the use requests selected by the priority selection block. This configuration brings about an advantage of granting a use request on the basis of both an elapsed time from the granting done last time and preset priority levels.

In the first mode of the disclosure, the above-mentioned arbitration circuit further has a priority setting block configured to set a priority level of the bus use for each of masters, wherein the priority selection block selects a use request of a master having the highest priority level set by the priority level setting block from among the use requests. This configuration brings about an advantage of selecting a use requests on the basis of preset priorities by setting a priority level for each master in advance.

In the first mode of the disclosure, in the above-mentioned arbitration circuit, the use request grant block has a use request selection block configured to select a use request of any one of masters from among use requests not limited by the use frequency limitation block received from masters; and an adjustment block configured to grant the use request a predetermined time after the selection of the use request by the use request selection block. This configuration brings about an advantage of granting a use request a predetermined period of time after the selection of the use request.

In the first mode of the disclosure, in the above-mentioned arbitration circuit, the use frequency setting block sets, for each of masters, a use request monitoring period and the number of use requests to be granted within the use request monitoring period. This configuration brings about an advantage of not granting a use request from a master corresponding to a use request granted last time.

In the first mode of the disclosure, in the above-mentioned arbitration circuit, the use frequency setting block sets, for each of masters, at least one of a use request monitoring period and the number of use requests to be granted for each of masters. This configuration brings about an advantage of limiting use requests on the basis of both a period and the number of use requests.

In the first mode of the disclosure, in the above-mentioned arbitration circuit, the use frequency setting block sets, for each of masters, a use request monitoring period or the number of use requests to be granted for each of masters. This configuration brings about an advantage of limiting use requests on the basis of a period or the number of use requests.

According the embodiments of the present disclosure, if the band of each master is changed, the bus control between master and slave can be optimized without changing the hardware thereof.

BRIEF DESCRIPTION OF THE DRAWINGS

FIG. 5 is a diagram illustrating a setting example of the bandpass filter practiced as the first embodiment of the disclosure;

FIG. 6 is a diagram illustrating a setting example of a variable priority filter practiced as the first embodiment of the disclosure;

FIG. 11 is a timing chart indicative of an exemplary operation result of the arbitration circuit practiced as the first embodiment of the disclosure;

FIG. 18 is a timing chart indicative of an exemplary operation result of the arbitration circuit practiced as the second embodiment of the disclosure;

FIG. 21 is a diagram illustrating a setting example of a variable priority filter practiced as the third embodiment of the disclosure;

FIG. 23 is a timing chart indicative of an exemplary operation result of the arbitration circuit practiced as the third embodiment of the disclosure;

FIG. 28 is a timing chart indicative of an exemplary operation result of the arbitration circuit practiced as the fourth embodiment of the disclosure;

DETAILED DESCRIPTION OF THE PREFERRED EMBODIMENTS

This disclosure will be described in further detail by way of embodiments thereof with reference to the accompanying drawings. The description will be made in the following order:

(1) the first embodiment (an arbitration circuit in which variable priority scheme is used after band limitation);

(2) the second embodiment (an arbitration circuit in which a longest elapsed time scheme is used after band limitation);

(3) the third embodiment (an arbitration circuit in which a variable priority scheme and a longest elapsed time scheme are used after band limitation);

(4) the fourth embodiment (an arbitration circuit in which request signal grant timing is adjusted); and (5) the fifth embodiment (an arbitration circuit in which only a cycle period is set in setting band limitation).

(1) The First Embodiment

Configuration of Bus Control Apparatus

Figure 1:
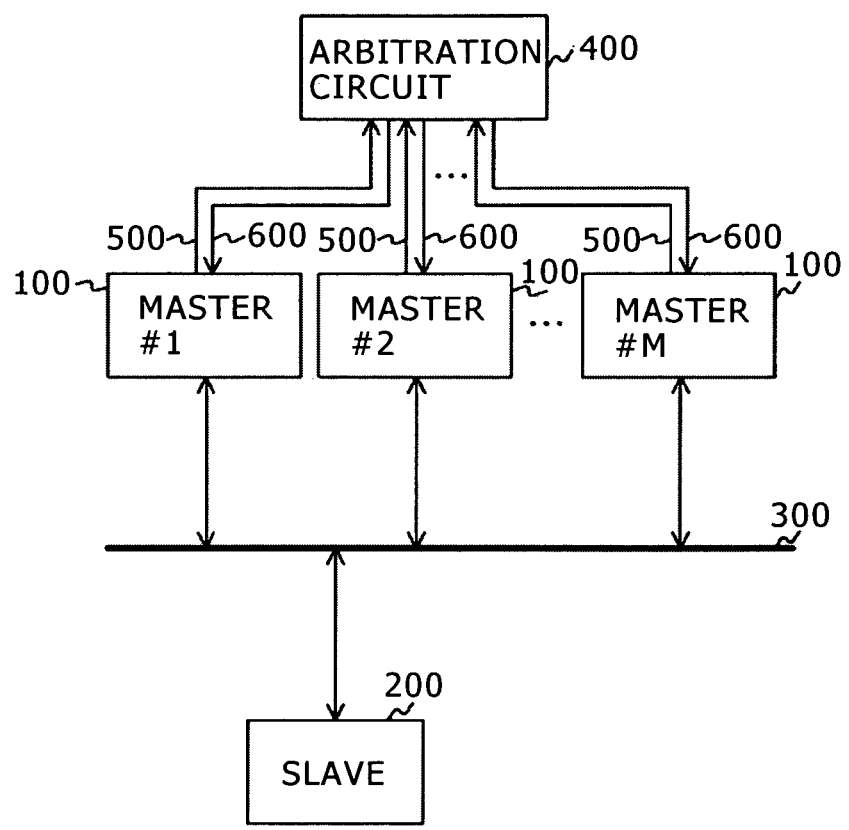
FIG. 1 is a schematic diagram illustrating an exemplary entire configuration of a bus control apparatus practiced as a first embodiment of the disclosure.

Now, referring to FIG. 1, there is shown a schematic diagram illustrating an exemplary entire configuration of a bus practiced as the first embodiment of the disclosure. This bus control apparatus has M (M being an integer) masters 100, a slave 200, a bus 300, and an arbitration circuit 400. The masters 100 and the arbitration circuit 400 are interconnected by a signal line 500 and a signal line 600.

The signal line 500 is a signal line over which a request for arbitration is transmitted from the master 100 to the arbitration circuit 400. The signal line 600 is a signal line over which a result of arbitration is transmitted from the arbitration circuit 400 to the master 100. Arbitration herein denotes that, when the arbitration circuit 400 have received request signals from two or more masters, the arbitration circuit 400 transmits a grant signal to any of these masters. A request signal is a signal for the master 100 to request the use of bus 300. A grant signal is a signal by which the arbitration circuit 400 grants the use of the bus 300 to a master.

The master 100 is a device that can control the slave 200. The slave 200 is a device to be controlled by the master 100. The master 100 may be a processor for example. The slave 200 may be a memory for example. In this case, when a data transfer is executed between the processor and the memory, the processor controls the memory by issuing the address and so on to the memory. The bus 300 provides a common path for the master 100 and the slave 200 to transmit and receive data therebetween. When the master 100 controls the slave 200 via the bus 300, the master 100 transmits a request signal for the use of the bus 300 to the arbitration circuit 400 via the signal line 500.

The arbitration circuit 400 arbitrates one master 100 for the request signals received from two or more masters 100. When the arbitration circuit 400 receives request signals from two or more masters 100, the arbitration circuit 400 arbitrates these request signals on the basis of a predetermined arbitration policy. The arbitration policy will be detailed later with reference to FIG. 2. On the basis of an arbitration result, the arbitration circuit 400 generates a grant signal to grant one master for the use of the 300 and transmits the generated grant signal to that master via the signal line 600. Receiving the grant signal from the arbitration circuit 400, the master 100 uses the bus 300 to execute a data transfer for controlling the slave 200.

Figure 2:
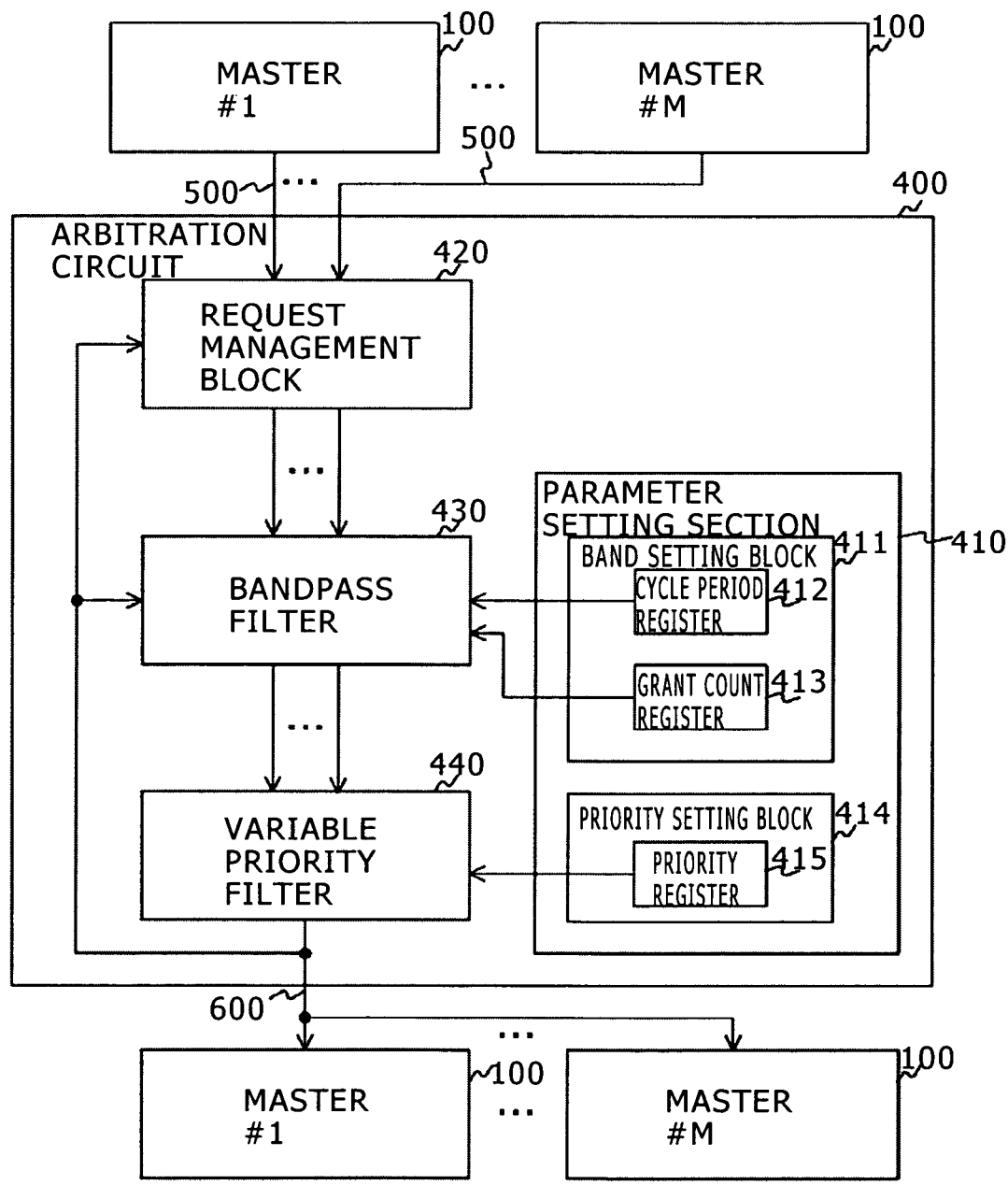
FIG. 2 is a block diagram illustrating an exemplary configuration of an arbitration circuit practiced as the first embodiment of the disclosure.

Referring to FIG. 2, there is shown a block diagram illustrating an exemplary configuration of the arbitration circuit 400 as one example of an arbitration circuit practiced as the first embodiment of the disclosure. This arbitration circuit 400 has a parameter setting section 410, a request management section 420, a bandpass filter 430, and a variable priority filter 440.

The parameter setting section 410 sets a setting value for limiting a transfer rate based on the use frequency of the bus 300 to within a band and a priority level in the use of the bus 300 for each master. This parameter setting section 410 has a band setting block 411 and a priority setting block 414.

The band setting block 411 sets a setting value for limiting a transfer rate based on the use frequency of the bus 300 to within a band for each master. In the first embodiment, the band setting block 411 has a cycle period register 412 and a grant count register 413.

In the first embodiment, a cycle period and a maximum number of grants are set for each master. The cycle period is a period in which a request signal is monitored. The maximum number of grants is a maximum value of the number of grant signals of which transmission is granted within a preset period. The setting value of the cycle period of each master is stored in the cycle period register 412. The setting value of the maximum number of grants of each master is stored in the grant count register 413. The band setting block 411 transmits the information stored in the cycle period register 412 and the grant count register 413 to the bandpass filter 430.

Here, the arbitration circuit 400 can update the information stored in the cycle period register 412 and the grant count register 413 in response to the change of applications for controlling the slave 200 by the master 100.

The priority setting block 414 sets the priority level of bus use by the master 100 for each master. In the present embodiment, the priority setting block 414 has a priority register 415. The priority register 415 stores information indicative of the priority levels between the masters. The priority setting block 414 transmits the information stored in the priority register 415 to the variable priority filter 440. In the first embodiment, in order to avoid the access contention to the bus 300, it is assumed that no same priority level be set to two or more masters. The arbitration circuit 400 can update the information stored in the priority register 415 in response to the change in applications for controlling the slave 200 by the master 100.

The request management section 420 receives request signals from masters and transmits the request signals not granted among the received request signals to the bandpass filter 430. To be more specific, the request management section 420 receives request signals from masters and counts the number of request signals not granted among the received request signals. The request management section 420 transmits the request signal of a master having at least one request signal not granted to the bandpass filter 430. Then, when the request signal is granted, the request management section 420 decrements the number of request signals not granted by one.

The bandpass filter 430 limits the request signal for each master so as to prevent a transfer rate based on the bus use frequency of each master transmitted from the request management section 420 from exceeding a preset band. To be more specific, the bandpass filter 430 receives, from the band setting block 411, information indicative of the cycle period and the maximum number grants set to each master. Then, the bandpass filter 430 counts the number of grant signals received from the variable priority filter 440 within a cycle period. If the counted number of grant signals is in excess of the maximum number of grants set to that master, then the bandpass filter 430 masks this request signal within this cycle period. Consequently, the bandpass filter 430 outputs an unmasked request signal to the variable priority filter 440. Here, the bandpass filter 430 does not limit any request signal unless the preset band is exceeded, so that the bandpass filter 430 sometimes outputs the request signals received from two or more masters to the variable priority filter 440.

The variable priority filter 440 grants the request signal of a master having the highest priority level from among the request signals not masked by the bandpass filter 430. To be more specific, the variable priority filter 440 gets the priority levels set between the masters from the priority setting block 414 in advance. Next, when the variable priority filter 440 receives request signals from the bandpass filter 430, the variable priority filter 440 selects the request signal from the master having the highest priority level. Then, the variable priority filter 440 generates a grant signal for granting the use of the bus and transmits the generated grant signal to the master corresponding to the selected request signal. The variable priority filter 440 notifies the request management section 420 and the bandpass filter 430 of the transmitted grant signal.

It should be noted that the band setting block 411 of the above-mentioned embodiment is only an example of a use frequency setting block. It should also be noted that the request management section 420 of the above-mentioned embodiment is only an example of a use request management section. It should further be noted that the bandpass filter 430 of the above-mentioned embodiment is only an example of a bandpass block. It should be still further noted that the variable priority filter 440 of the above-mentioned embodiment of only an example of a use request permission block.

Figure 3:
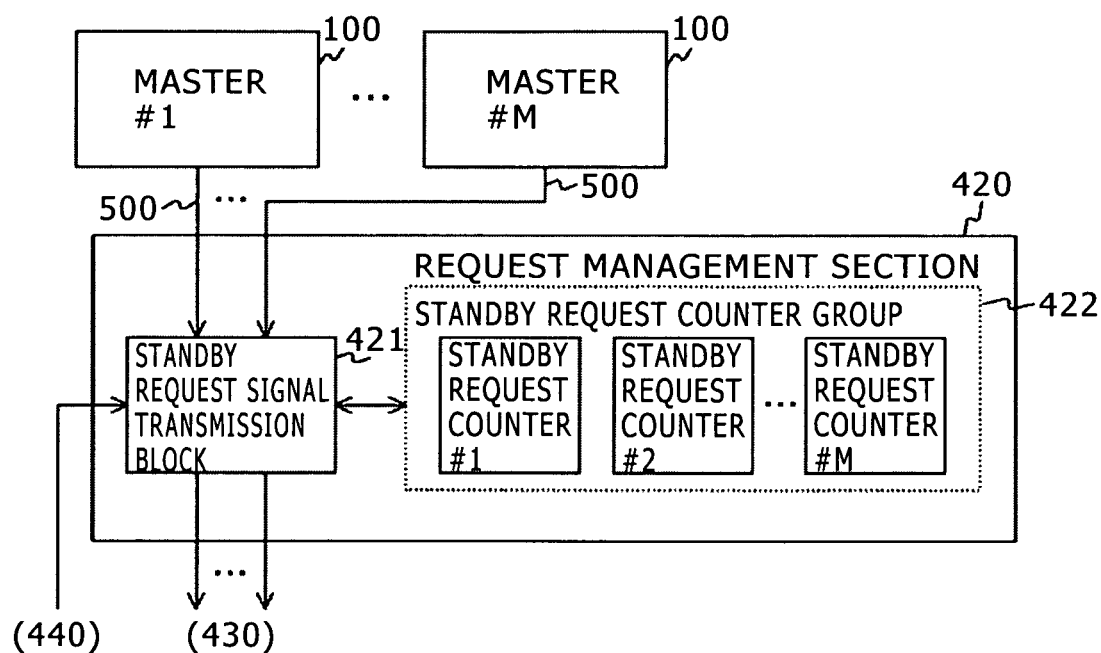
FIG. 3 is a block diagram illustrating an exemplary configuration of a request management section practiced as the first embodiment of the disclosure.

Referring to FIG. 3, there is shown a block diagram illustrating an exemplary configuration of the request management section 420 as an example of a use request management section practiced as the first embodiment of the disclosure. The request management section 420 has a standby request signal transmission block 421 and a standby request counter group 422.

The standby request counter group 422 has a standby request counter for each master. The standby request counters count request signals not granted among the received request signals.

The standby request signal transmission block 421 transmits request signals not granted among the received request signals to the bandpass filter 430. To be more specific, every time a request signal is received from each master, the standby request signal transmission block 421 increments, by one, the count value of the standby request counter corresponding to this master in the standby request counter group 422. Next, the standby request signal transmission block 421 references the value of the standby request counter of each master in the standby request counter group 422 and transmits the request signals of masters of which value is at least one to the bandpass filter 430.

After transmitting request signals to the bandpass filter 430, the standby request signal transmission block 421 receives a notification of a transmitted grant signal from the variable priority filter 440. In the standby request counter group 422, the standby request signal transmission block 421 decrements, by one, the value of the standby request counter of the master corresponding to the notified grant signal.

Figure 4:
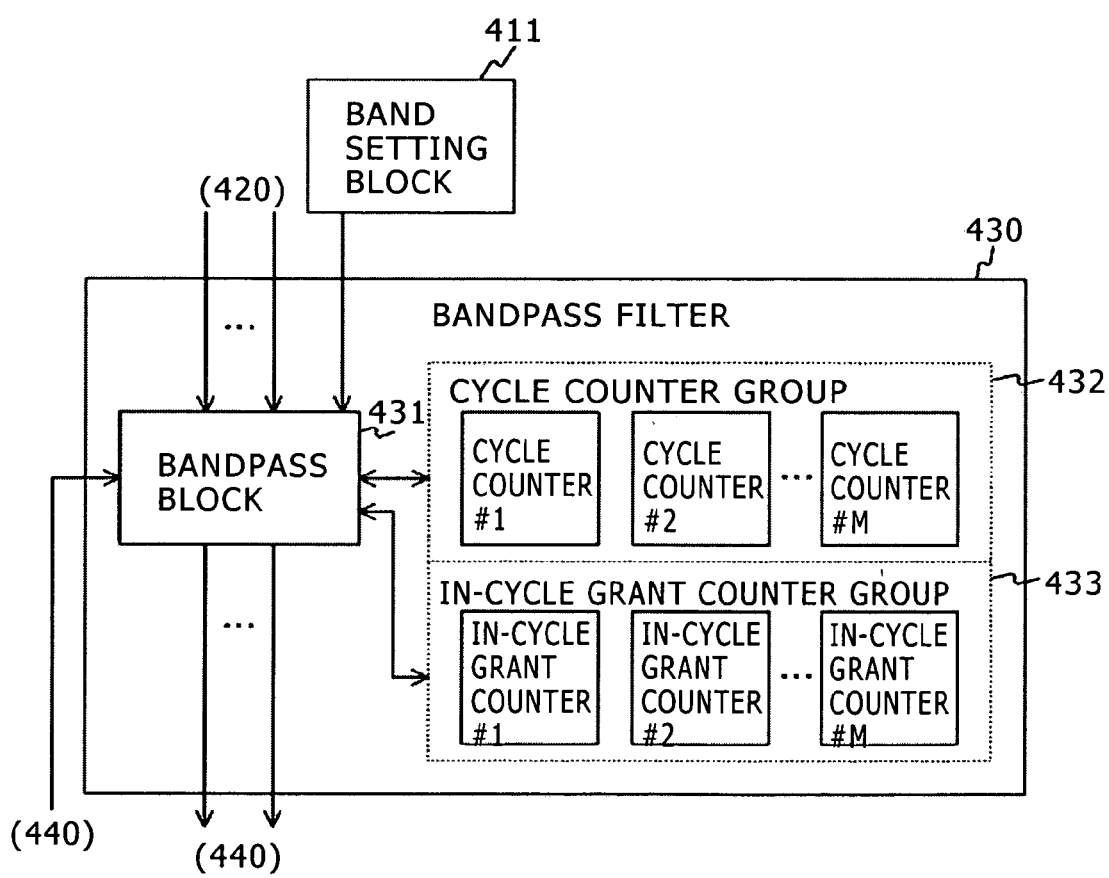
FIG. 4 is a block diagram illustrating an exemplary configuration of a bandpass filter practiced as the first embodiment of the disclosure.

Referring to FIG. 4, there is shown a block diagram illustrating an exemplary configuration of the bandpass filter 430 as an example of a bandpass block practiced as the first embodiment of the disclosure. The bandpass filter 430 has a bandpass block 431, a cycle counter group 432, and an in-cycle grant counter group 433.

The cycle counter group 432 has a cycle counter for each master. These cycle counters count an elapsed time during a cycle period. The in-cycle grant counter group 433 has an in-cycle ground counter for each master. These in-cycle grant counters count the number of grant signals transmitted to a corresponding master during a preset cycle.

The bandpass block 431 first initializes each counter in the cycle counter group 432 and the in-cycle grant counter group 433. In addition, the bandpass block 431 receives information indicative of setting values of the cycle period of each master and the maximum number of grants of each master.

This bandpass block 431 operates on the basis of a system clock, incrementing, by one, the value of the cycle counter of each master in the cycle counter group 432 in every clock cycle. The bandpass block 431 references the cycle period of each master stored in the cycle period register 412 and the maximum number of grants of each master stored in the grant count register 413. It is assumed here that the value of the in-cycle grant counter of any of the masters among the in-cycle grant counter group 433 be at least the maximum number grants of this master in the grant count register 413. In this case, the bandpass block 431 masks the request signal received from this master. The bandpass block 431 receives a notification of the grant signal transmitted from the variable priority filter 440. Every time the notification of a grant signal is received, the bandpass block 431 increments, by one, the value of the in-cycle grant counter of the master to which this grant signal has been transmitted in the in-cycle grant counter group 433. Next, if the value of the cycle counter has exceeded the cycle period of the master corresponding to this cycle counter, the bandpass block 431 initializes the value of the cycle counter corresponding to this master among the cycle counter group 432. At the same time, of the in-cycle grant counter group 433, the bandpass block 431 initializes the value of the in-cycle grant counter corresponding to this master.

As described above, the bandpass block 431 counts the number of grant signals for each master within a cycle period set to each master and, if the counted value is in excess of the preset value, the bandpass block 431 masks the request signal. The above-mentioned configuration allows the bandpass block 431 to limit the transfer rate based on the bus use frequency to within the band for each master.

Referring to FIG. 5, there is shown a setting example of the cycle period and the maximum number of grants for each master. For example, for master #1, cycle period "5" and the maximum number of grants "4" are set. In this case, the bandpass filter 430 masks the request signals received from master #1 subsequent to a point of time at which the number of grant signals to master #1 has become 4 in 5 clock cycles.

For master #2 and master #3, cycle period "4" and the maximum number of grants "2" are set. In this case, the bandpass filter 430 masks the request signals received from master #2 subsequent to a point of time at which the number of grant signals to master #2 has become 2 in 4 clock cycles. At the same time, the bandpass filter 430 masks the request signals received from master #3 subsequent to a point of time at which the number of grant signals to master #3 has become 2 in 4 clock cycles.

Referring to FIG. 6, there is shown an example of setting of priority levels of masters. The variable priority filter 440 determines that the lower the setting value of priority level of a master, the higher the priority level of that master. For example, "0" is set to master #1, "2" is set to master #2, and "1" is set to master #3. If requests are received from all of masters #1 through #3 within one clock cycle, then the variable priority filter 440 determines that master #1 to which priority level "0" is set has the highest priority, level, thereby generating a grant signal only for master #1.

Operation of the Bus Control Apparatus

The following describes a control procedure of the arbitration circuit 400 practiced as the first embodiment of the disclosure with reference to FIGS. 7 through 10.

Figure 7:
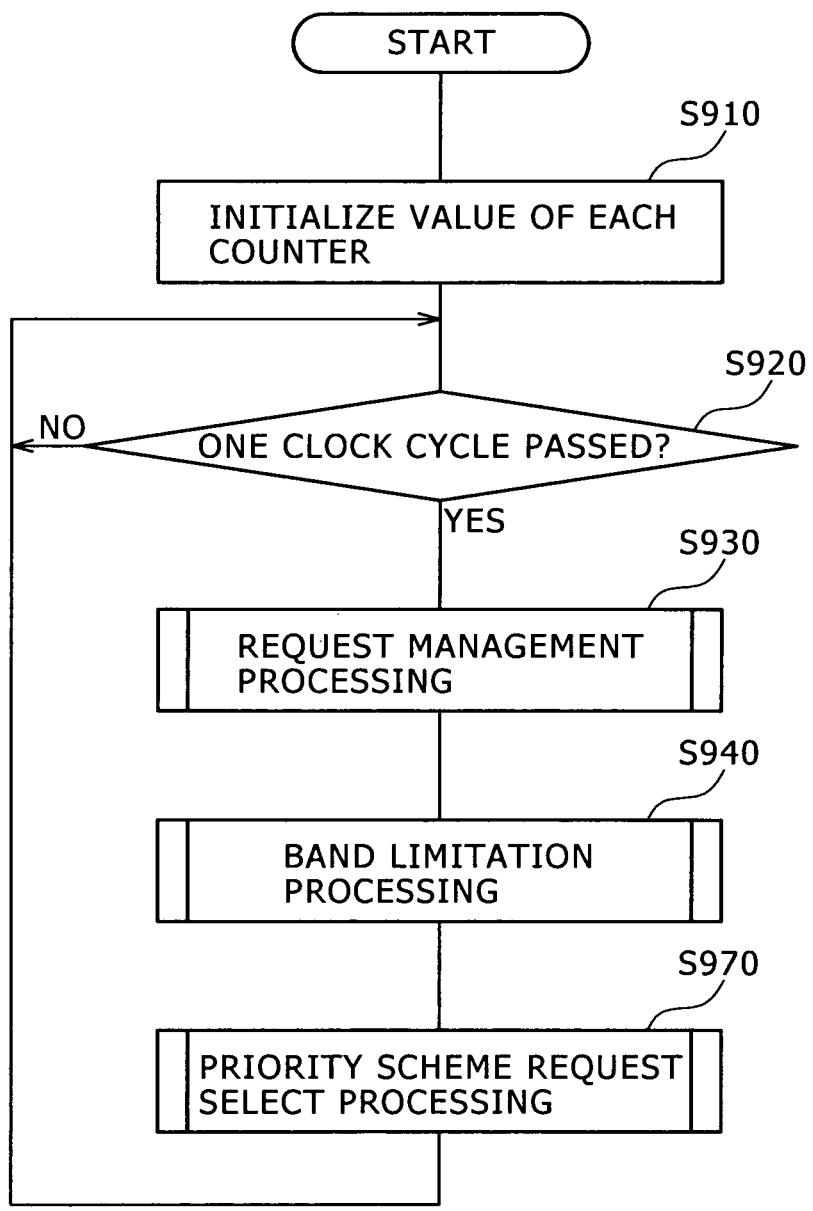
FIG. 7 is a flowchart indicative of an exemplary control procedure of the arbitration circuit practiced as the first embodiment of the disclosure.

Referring to FIG. 7, there is shown a flowchart indicative of an exemplary control procedure to be executed by the arbitration circuit 400 practiced as the first embodiment of the disclosure. This control procedure is started when the arbitration circuit 400 is powered on or when an application for the master 100 to control the slave 200 is executed.

The request management section 420 and the bandpass filter 430 initialize the values of the counters under the management thereof (step S910). The arbitration circuit 400 determines whether one clock cycle has passed or not (step S920). If one clock cycle is found to have not passed (No in step S920), then the arbitration circuit 400 returns to step S920.

If one clock cycle is found to have passed (Yes in step S920), then the request management section 420 executes request management processing for transmitting a request signal not granted (step S930). The bandpass filter 430 executes bandpass processing for limiting the transfer rate of each master to lower than a predetermined band (step S940). Next, the variable priority filter 440 executes priority scheme request select processing for selecting a request signal on the basis of a priority level (step S970). After step S970, the arbitration circuit 400 returns to step S920.

Figure 8:
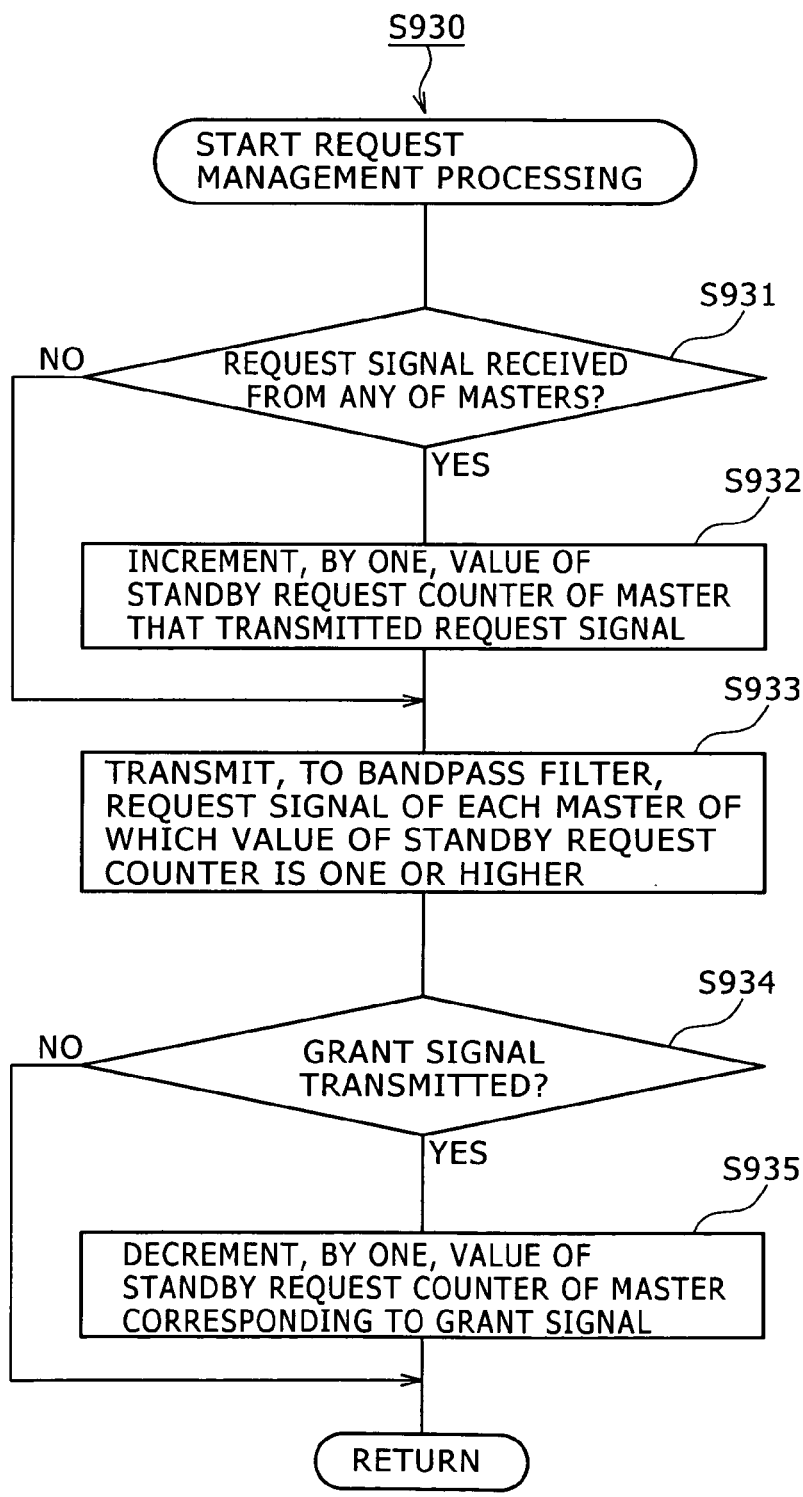
FIG. 8 is a flowchart indicative of exemplary request management processing practiced as the first embodiment of the disclosure.

Referring to FIG. 8, there is shown a flowchart indicative of an exemplary request management processing practiced as the first embodiment of the disclosure. The standby request signal transmission block 421 determines whether a request signal from any of the masters has been received or not (step S931). The following describes the case where a request signal is found received from any of the masters (Yes in step S931). In this case, the standby request signal transmission block 421 increments, by one, the value of the standby request counter that has transmitted the request signal among the standby request counter group 422 (step S932).

Among the standby request counter group 422, the standby request signal transmission block 421 transmits a request signal of each master of which value of the standby request counter being one or higher to the bandpass filter 430 (step S933).

The standby request signal transmission block 421 determines whether a grant signal has come from the variable priority filter 440 (step S934). If a grant signal is found to have come (Yes in step S934), then the standby request signal transmission block 421 decrements, by one, the value of the standby request counter of the master corresponding to the received grant signal among the standby request counter group 422 (step S935). After step S935, the standby request signal transmission block 421 terminates the request management processing.

Figure 9:
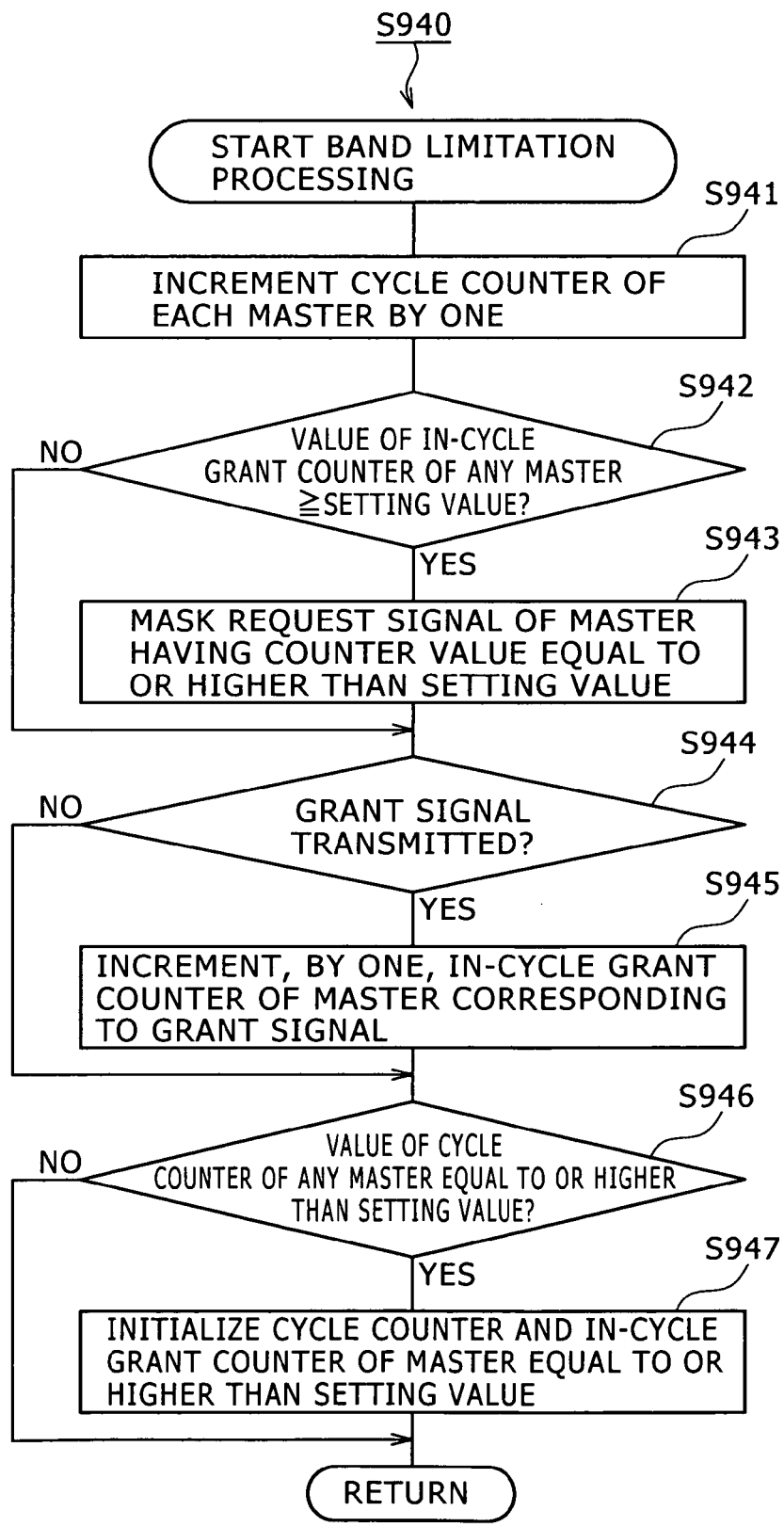
FIG. 9 is a flowchart indicative of exemplary bandpass processing practiced as the first embodiment of the disclosure.

Referring to FIG. 9, there is shown a flowchart indicative of exemplary bandpass processing practiced as the first embodiment of the disclosure. The bandpass block 431 increments, by one, the value of the cycle counter of each master in the cycle counter group 432 (step S941). The bandpass block 431 gets the maximum number grants of each master stored in the grant count register 413. The bandpass block 431 compares a value of the in-cycle grant counter of each master in the in-cycle grant counter group 433 with a setting value of the maximum number of grants of each master. Next, the bandpass block 431 determines whether the value of the in-cycle grant counter of any master in the in-cycle grant counter group 433 is equal to or higher than the setting value (step S942). If the value of the in-cycle counter of any master in the in-cycle grant counter group 433 is found to be equal to or higher than the setting value (Yes in step S942), then the bandpass block 431 masks the request signal of that master (step S943).

The following describes the case where the values of the in-cycle grant counters of all masters in the in-cycle grant counter group 433 are found to be lower than the setting value (No in step S942) or the processing to be executed after step S943. In this case, the bandpass block 431 determines whether the notification of a grant signal has come from the variable priority filter 440 (step S944). If the notification of a grant signal is found to have come (Yes in step S944), then the bandpass block 431 increments, by one, the value of the in-cycle grant counter of the master corresponding to the received grant signal among the in-cycle grant counter group 433 (step S945).

If the notification of a grant signal is found to have not come (No in step S944) or, after step S945, the bandpass block 431 gets a cycle period of each master stored in the cycle period register 412. The bandpass block 431 determines whether the value of the cycle counter of any master in the cycle counter group 432 is in excess of the cycle period (step S946).

The following describes the case where the value of the cycle counter of any master is found to be in excess of the cycle period (Yes in step S946). In this case, the bandpass block 431 initializes the value of the cycle counter corresponding to the master in excess of the setting value in the cycle counter group 432. At the same time, the bandpass block 431 initializes the value of the in-cycle grant counter corresponding to the master in excess of the setting value in the in-cycle grant counter group 433 (step S947). If the value of the cycle counter of each master is not in excess of the setting value (No in step S946) or, after step S947, the bandpass block 431 terminates the bandpass processing within one clock cycle.

Figure 10:
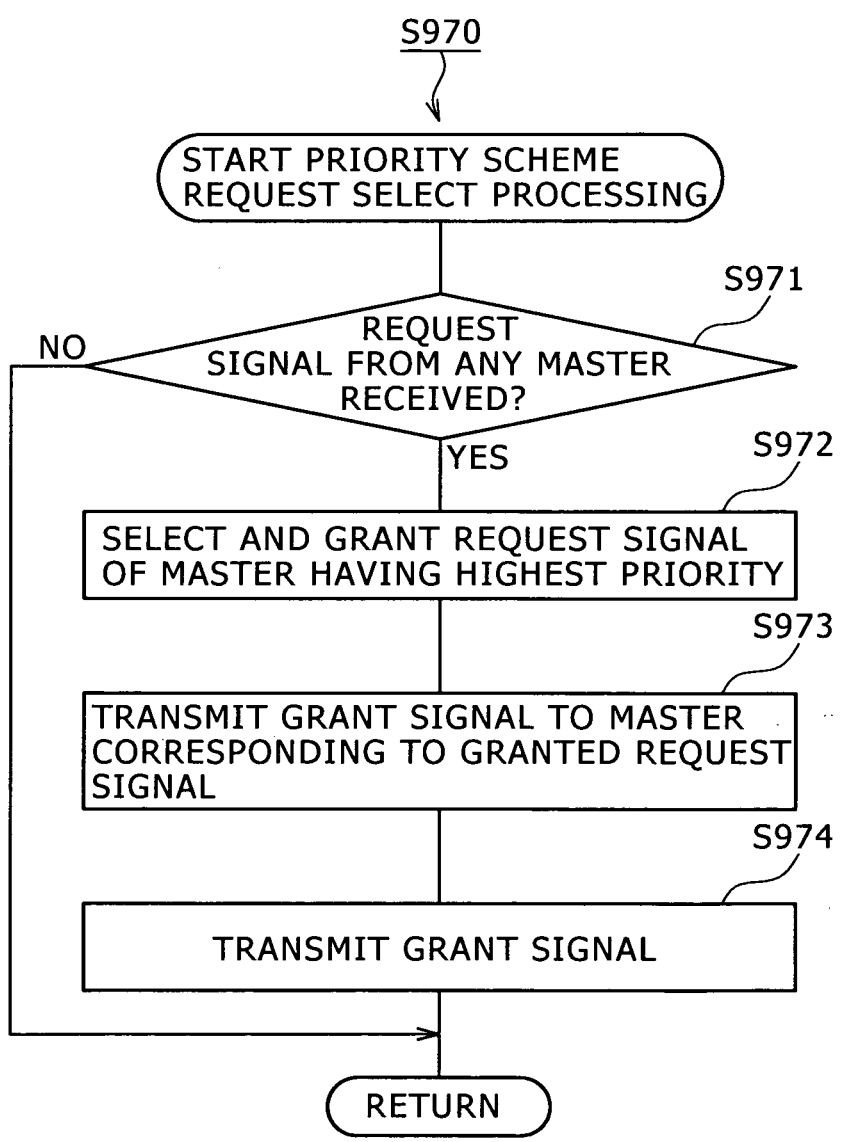
FIG. 10 is a flowchart indicative of exemplary priority scheme request select processing practiced as the first embodiment of the disclosure.

Referring to FIG. 10, there is shown a flowchart indicative of exemplary priority scheme request select processing practiced as the first embodiment of the disclosure. The variable priority filter 440 determines whether a request signal has been received from any master (step S971). If a request signal from any master is found received (Yes in step S971), then the variable priority filter 440 selects the request signal of the master having the highest priority level from among the requests that have passed the bandpass filter 430 and grants the request signal (step S972). Then, the variable priority filter 440 generates a grant signal and transmits the generation grant signal to the master corresponding to the granted request signal (step S973). The variable priority filter 440 notifies the request management section 420 and the bandpass filter 430 of the transmitted grant signal (step S974).

If the request signal is found not received from any masters (No in step S971) or, after step S974, the variable priority filter 440 terminates the priority scheme request select processing.

Figure 12:
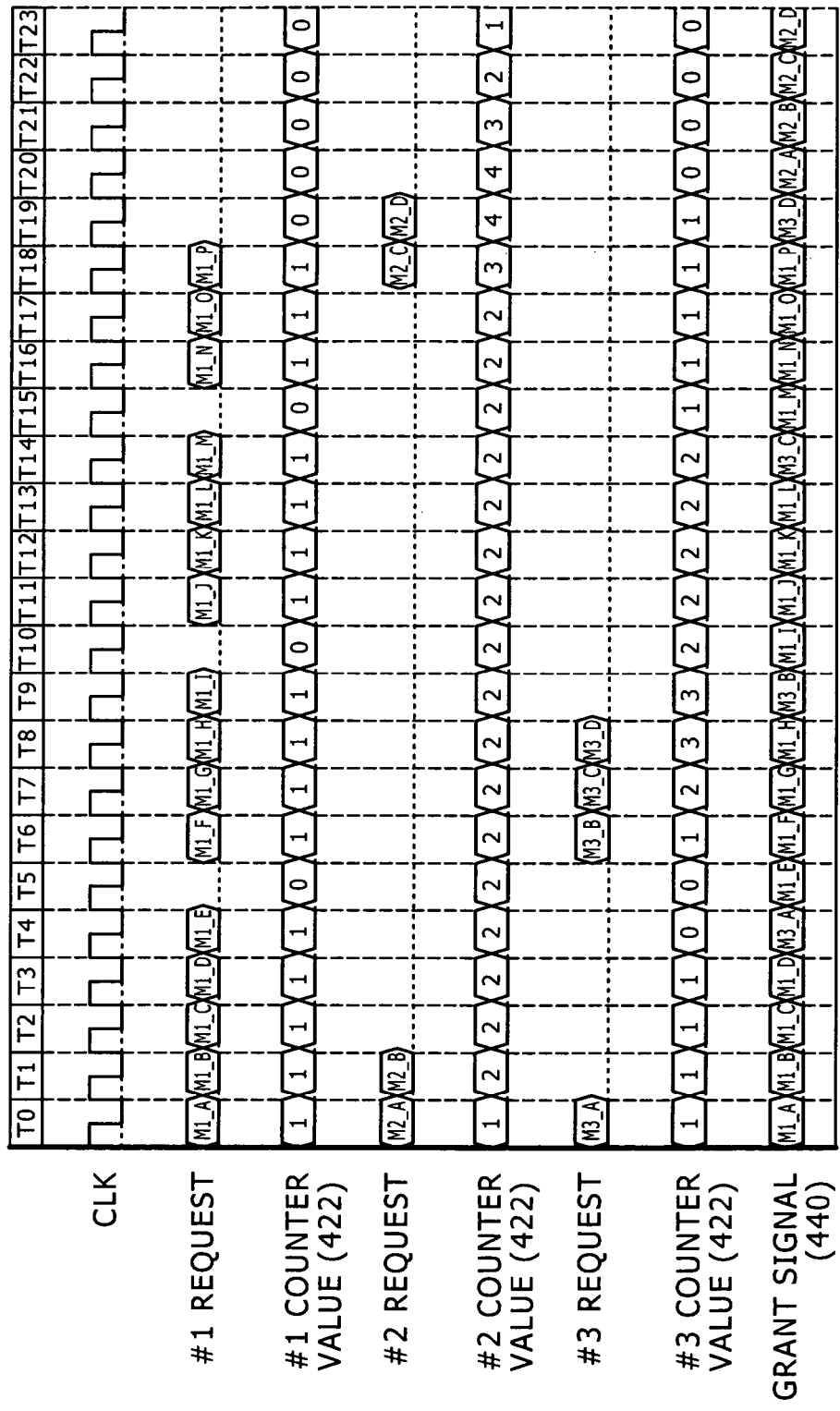
FIG. 12 is a timing chart indicative of another exemplary operation result of the arbitration circuit practiced as the first embodiment of the disclosure.

The following describes the results of operations executed by the arbitration circuit 400 practiced as the first embodiment of the disclosure with reference to FIG. 11 and FIG. 12.

Referring to FIG. 11, there is shown a flowchart indicative of exemplary results of an operation executed by the arbitration circuit 400 of the present embodiment. This example assumes that the bus control apparatus have three masters 100, #1, #2, and #3. It is also assumed that the values set to the bandpass filter 430 be the same as the setting values of masters #1, #2, and #3 shown in FIG. 5. It is further assumed that the values set to the variable priority filter 440 be the same as the setting values of masters #1, #2, and #3 shown in FIG. 6.

It is assumed here that, in the arbitration circuit 400, each filter transmit and receive a 3-bit signal indicative of the presence or absence of a request signal from each master. In the figure, bit 1 in these three bits after 3'*b* is indicative of the presence or absence of a request signal of master #1 and bit 2 and bit 3 in these three bits are indicative of request signals of masters #2 and #3. For example, signal 3'*b*010 is indicative that a request signal has received only from master #2.

Here, during clock cycles T0 through T5, signals 3'*b*11, 3'*b*110, 3'*b*100, 3'*b*100, 3'*b*100, and 3'*b*000 are received.

The request management section 420 receives request signals and, of the received request signals, transmits those request signals not granted to the bandpass filter 430. For example, in clock T0, signal 3'*b*111 indicative that the request signals have received from all masters is received. The request management section 420 increments, by one, the values of the standby request counters of all masters in the standby request counter group 422. Because the standby request counters of all masters are one or higher, the request management section 420 transmits signal 3'*b*111 to the bandpass filter 430. Next, receiving the notification of the grant signal transmitted to master #1, the request management section 420 decrements, by one, the value of the standby request counter of master #1.

The bandpass filter 430 determines whether the number of grants within each cycle period is equal to or higher than the setting value for each master. If the number of grants is found to be equal to or higher than the setting value, then the bandpass filter 430 masks the request signal of the master in excess of the setting value. For example, as shown in FIG. 5 for master #1, the cycle period is set to 5 and the maximum number of grants is set to 4. In accordance with these settings, the bandpass filter 430 masks the request signal from master #1 after a point of time at which the number of grant signals to master #1 becomes 4.

In this example, in four cycles, T0 through T3, the variable priority filter 440 transmits four grant signals from master #1. At clock T4, the number of times grant signals counted by the bandpass filter 430 is transmitted is equal to or higher than setting value 4. Hence, at clock T4, the bandpass filter 430 masks the request signal from master #1 from the received signal 3'*b*111 and transmits signal 3'*b*011.

Next, the variable priority filter 440 selects a request signal of a master having the highest priority level from among the request signals outputted from the bandpass filter 430. For example, at clock cycle T0, the variable priority filter 440 receives signal 3'*b*111 from the bandpass filter 430. Namely, request signals are outputted from any of masters #1 through #3. Here, as shown in FIG. 6, the priority levels of master #1, master #2 and master #3 are set to 0, 2, and 1, respectively, the master having the highest priority level being master #1. Therefore, the variable priority filter 440 selects the request signal of master #1 and transmits signal 3'*b*100.

Referring to FIG. 12, there is shown a timing chart indicative of exemplary results of an operation executed by the arbitration circuit 400 practiced as the first embodiment of the disclosure.

In this example, it is assumed that the number of masters and the settings of bandpass and priority level be the same as those previously described with reference to FIG. 11. It should also be noted that the number accompanying "M" in "M1_A" and so on in the figure denotes the number of master and the alphabet after "_" denotes that request signals have been received in the alphabetic order. These alphabets are for convenience in the indication of the number of received request signals. In the first embodiment of the disclosure, each request signal need not be added with an identifier.

It is assumed that a total of 16 request signals be received from master #1 in periods T0 through T4, T6 through T9, T11 through T14, and T16 through T18. It is assumed that a total of four request signals have been received from master #2 in periods T0, T1, T18, and T19. It is assumed that a total of four request signals have been received from master #3 in periods T0, T6, T7, and T8.

In this case, in periods T0 through T3, the arbitration circuit 400 receives request signals from master #1 four times, from master #2 two times, and from master #3 one time. Because the priority level of master #1 is the highest, the request signal from master #1 passes the bandpass filter 430 and the variable priority filter 440 in this period. Hence, the arbitration circuit 400 transmits grant signals to master #1 four times. Of the standby request counter group 422, the request management section 420 increments, by two, the value of the standby request counter of master #2 not granted. Of the standby request counter group 422, the request management section 420 increments, by one, the value of the standby request counter of master #3 not granted.

Because the number of grants of master #1 has become 4 in five clocks, the bandpass filter 430 limits the request signals from master #1 at T4. At this clock T4, the request management section 420 selects the request signals of master #2 and master #3 not granted and transmits the selected request signals to the bandpass filter 430. Because the priority level of master #3 is higher than that of master #2, the variable priority filter 440 grants the request signal of master #3. Of the standby request counter group 422, the request management section 420 decrements, by one, the value of each standby request counter of master #3 granted.

In periods T5 through T9, the request signal of master #1 having the highest priority level is granted four times and the request signal of master #3 having the next highest priority level is granted once.

The request signal of master #2 having the lowest priority level is transmitted four times up to T19, the request signal not granted every time. Hence, at this point of time, of the standby request counter group 422, the value of the standby request counter of master #2 is 4. At the point of time of T20, the request signals of master #1 and master #3 are all granted and the value of the standby request counters of these masters becomes 0 among the standby request counter group 422. Of the standby request counter group 422, the request management section 420 transmits only the request signal of master #2 of which standby request counter value is one or higher to the bandpass filter 430. Then, the request signal of master #2 is granted after T20.

As illustrated in FIG. 12, the bandpass filter 430, limits the band of master #1 having a high priority level, so that a grant signal is transmitted also to master #3 having a low priority level every five clocks. Thus, even if QoS (Quality of Service) differs from master to master, executing bandpass processing on every master can satisfy this QoS.

As described above, according to the first embodiment of the disclosure, the request management section 420 receives request signals and output request signals not granted from among the received request signals. The bandpass filter 430 limits the request signal for each master such that the transfer rate based on the bus use frequency by each master falls below a preset band. From among the request signals not granted, the variable priority filter 440 grants any request signal based on the priority level. To be more specific, according to the configuration described above, the arbitration circuit 400 can limit the data transfer rate based on bus use frequency to below the preset band for each master. In addition, because the band setting block 411 can set a band for each master, the arbitration circuit 400 can change the band set by the band setting block 411 without requiring hardware redesign.

It should be noted that, in the first embodiment of the disclosure, the bus control apparatus has one slave 200; it is also practicable for the bus control apparatus to have two or more slaves.

In addition, in the first embodiment of the disclosure, the arbitration circuit 400 is configured so as to select requests of one master by the priority scheme from among the requests that have passed the bandpass filter 430. However, because the arbitration circuit 400 can select requests of one master after the band limitation, the arbitration circuit 400 can also use a scheme other than the priority scheme. For example, the arbitration circuit 400 can use a maximum elapsed time scheme to be described later with reference to FIG. 13 or a scheme obtained by combining the maximum elapsed time scheme and the priority scheme to be described later with reference to FIG. 18. Obviously, the arbitration circuit 400 can use other schemes than mentioned above, such as a round-robin scheme.

In addition, in the first embodiment of the disclosure, the arbitration circuit 400 is configured such that the priority levels can be changed by updating the priority register 415; it is also obviously practicable to fix the priority level of each master.

Further, in the first embodiment of the disclosure, the arbitration circuit 400 is configured such that a period for monitoring a grant signal and the number of grants to be granted in that period are set in advance and the transfer rate is limited to within a band on the basis of these settings. However, if the transfer rate can be controlled for each master, then the arbitration circuit 400 can be configured such that values other than the period and the number of grants are set. For example, as will be described with reference to FIG. 29, the arbitration circuit 400 may be configured such that the number of grants to be granted within a period is fixed and only the period is set for each master. Also, the period may be fixed and only the number of grants may be set for each master. Further, the band itself may be set for each master.

(2) The Second Embodiment

Configuration of a Bus Control Apparatus

The following describes the second embodiment of the disclosure with reference to FIG. 13 through FIG. 17. The arbitration circuit 400 of the first embodiment executes master selection by the priority scheme after the bandpass processing. However, an arbitration circuit practiced as the second embodiment differs from the arbitration circuit 400 of the first embodiment in that each master is selected by the maximum elapsed time scheme after the bandpass processing.

Figure 13:
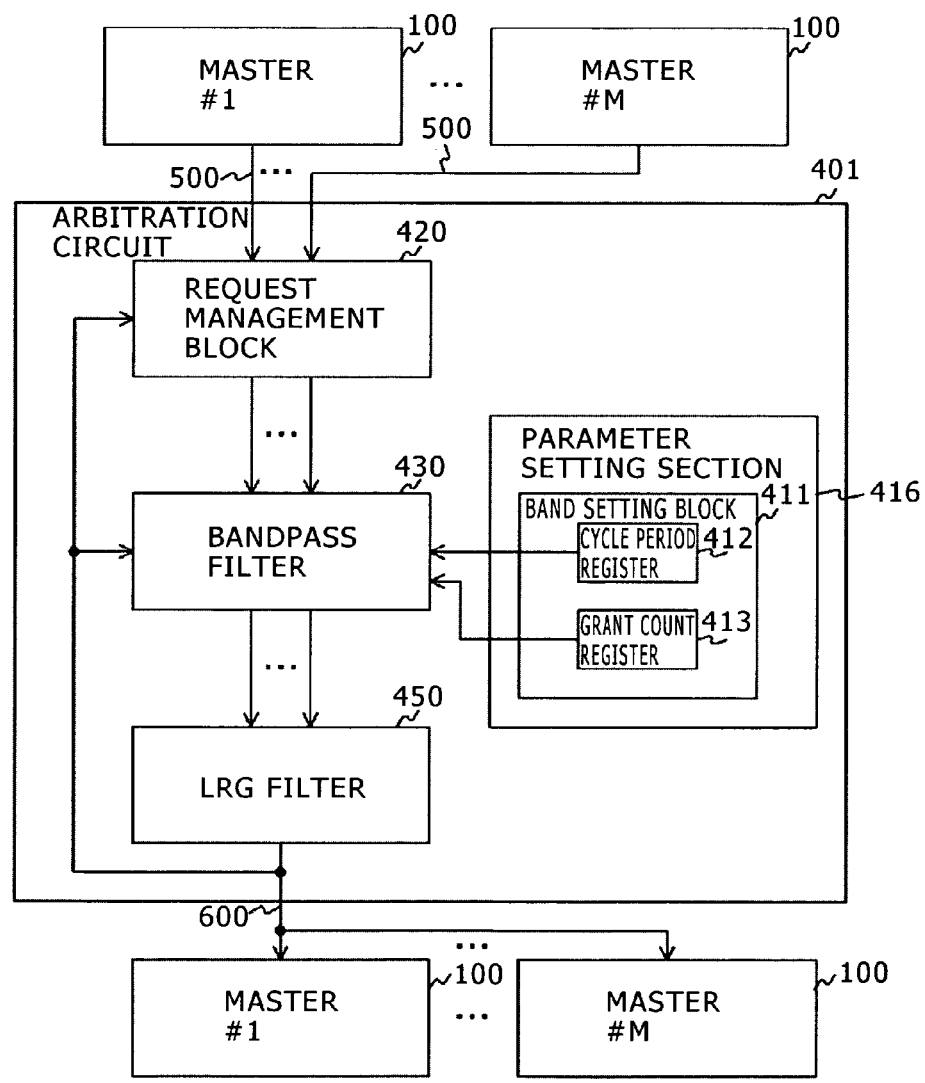
FIG. 13 is a schematic diagram illustrating an exemplary configuration of an arbitration circuit practiced as a second embodiment of the disclosure.

Referring to FIG. 13, there is shown a block diagram illustrating an arbitration circuit 401 as an example of an arbitration circuit practiced as the second embodiment of the disclosure. The arbitration circuit 401 differs from the arbitration circuit 400 in that a parameter setting section 416 is arranged instead of the parameter setting section 410 and an LRG filter 450 is arranged instead of the variable priority filter 440. The parameter setting section 416 differs from the parameter setting section 410 in that the priority setting block 414 of the first embodiment is not arranged.

From among the request signals not masked by a bandpass filter 430, the LRG filter 450 selects a request signal of the master having a longest elapsed time from the transmission of a grant signal transmitted last time by the LRG filter 450 and grants the selected request signal. Thus, a scheme in which, from among two or more request signals, the request signal of the master having the longest elapsed time from the transmission of the last grant signal is also referred to as an LRG (Least Recently Granted) scheme. The LRG filter 450 generates a grant signal to the master granted by the LRG filter 450 and outputs the generated grant signal to that master via a signal line 600.

It should be noted that the LRG filter 450 practiced as the second embodiment of the disclosure is one example of a use request grant block.

Figure 14:
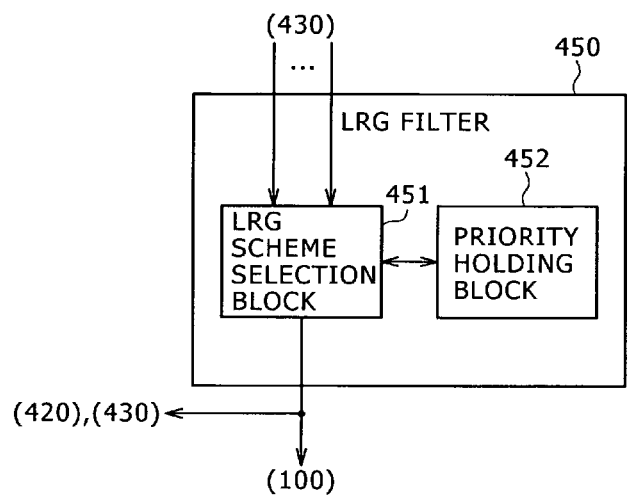
FIG. 14 is a schematic diagram illustrating an exemplary entire configuration of an LRG filter practiced as the second embodiment of the disclosure.

Referring to FIG. 14, there is shown a block diagram illustrating an exemplary configuration of the LRG filter 450 as one example of the use request grant block practiced as the second embodiment of the disclosure. The LRG filter 450 has an LRG scheme selection block 451 and a priority holding block 452.

The priority holding block 452 holds the values of priority levels for all masters. It is assumed, for example, smaller the values held in the priority holding block 452, the higher the priority levels of the masters.

The LRG scheme selection block 451 operates on a system clock. First, the LRG scheme selection block 451 initializes each of the priority levels held in the priority holding block 452. In the initialization, no same priority level is allocated to two or more masters. Then, if there are any request signals not masked by the bandpass filter 430, the LRG scheme selection block 451 selects the request signal of the master having the highest priority level and grants the selected request signal.

The LRG scheme selection block 451 updates the priority levels held in the priority holding block 452 such that the priority level of the master corresponding to the granted request signal becomes the lowest. Then, the LRG scheme selection block 451 transmits the grant signal to the master corresponding to the granted request signal. Next, the LRG scheme selection block 451 notifies a request management section 420 and a bandpass filter 430 of the transmitted grant signal.

Figure 15:
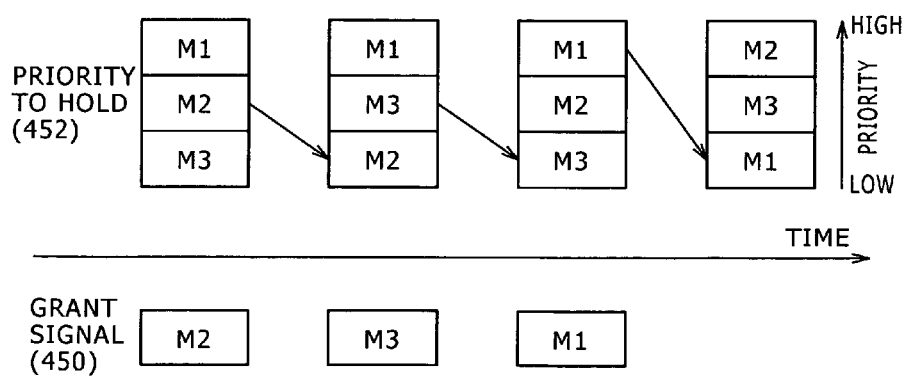
FIG. 15 is a schematic diagram illustrating another exemplary configuration of an LRG filter practiced as the second embodiment of the disclosure.

Referring to FIG. 15, there is shown a diagram for describing an exemplary configuration of the LRG filter practiced as the second embodiment of the disclosure. This example assumes that the bus control apparatus have three master 100, M1, M2, and M3. In the initialization, it is assumed that the LRG filter 450 hold the priority levels of the masters M1, M2, and M3 in the descending order of priority levels. If M2 and M3 are not masked by the bandpass filter 430 at a certain point of time, then the LRG filter 450 grants M2 having the higher priority level than that of M3. Then, a grant signal is outputted to M2. The LRG scheme selection block 451 updates the values held by the priority holding block 452 such that the priority level of granted M2 becomes the lowest. As a result, the priority levels held in the priority holding block 452 are arranged in the descending order of M1, M3, and M2. Then, if M3 is not masked by the bandpass filter 430, the LRG filter 450 grants M3. The LRG scheme selection block 451 updates the values held by the priority holding block 452 such that the priority level of this master becomes the lowest. As a result, the priority levels held in the priority holding block 452 are arranged in the descending order of M1, M2, and M3. Thus, the LRG filter 450 dynamically updates the priority levels on the basis of grant signals.

Operations of the Bus Control Apparatus

Figure 16:
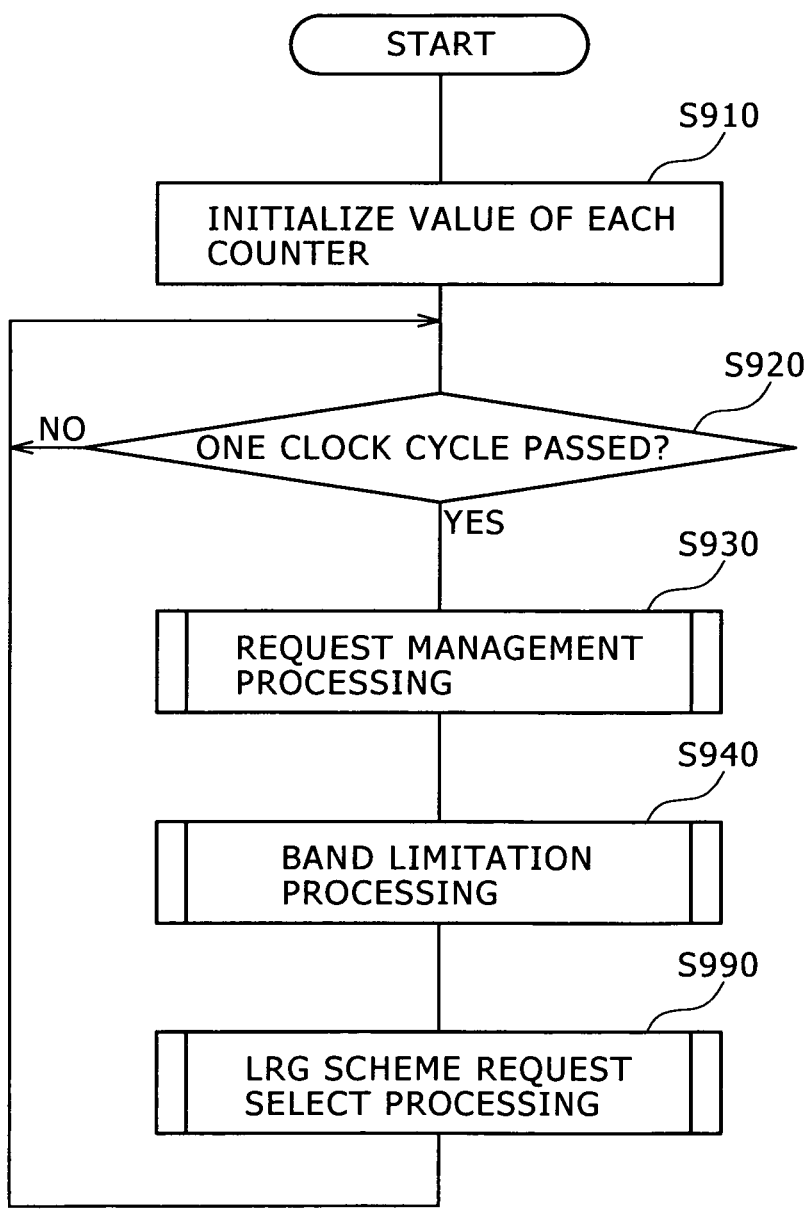
FIG. 16 is a flowchart indicative of an exemplary control procedure of the arbitration circuit practiced as the second embodiment of the disclosure.
Figure 17:
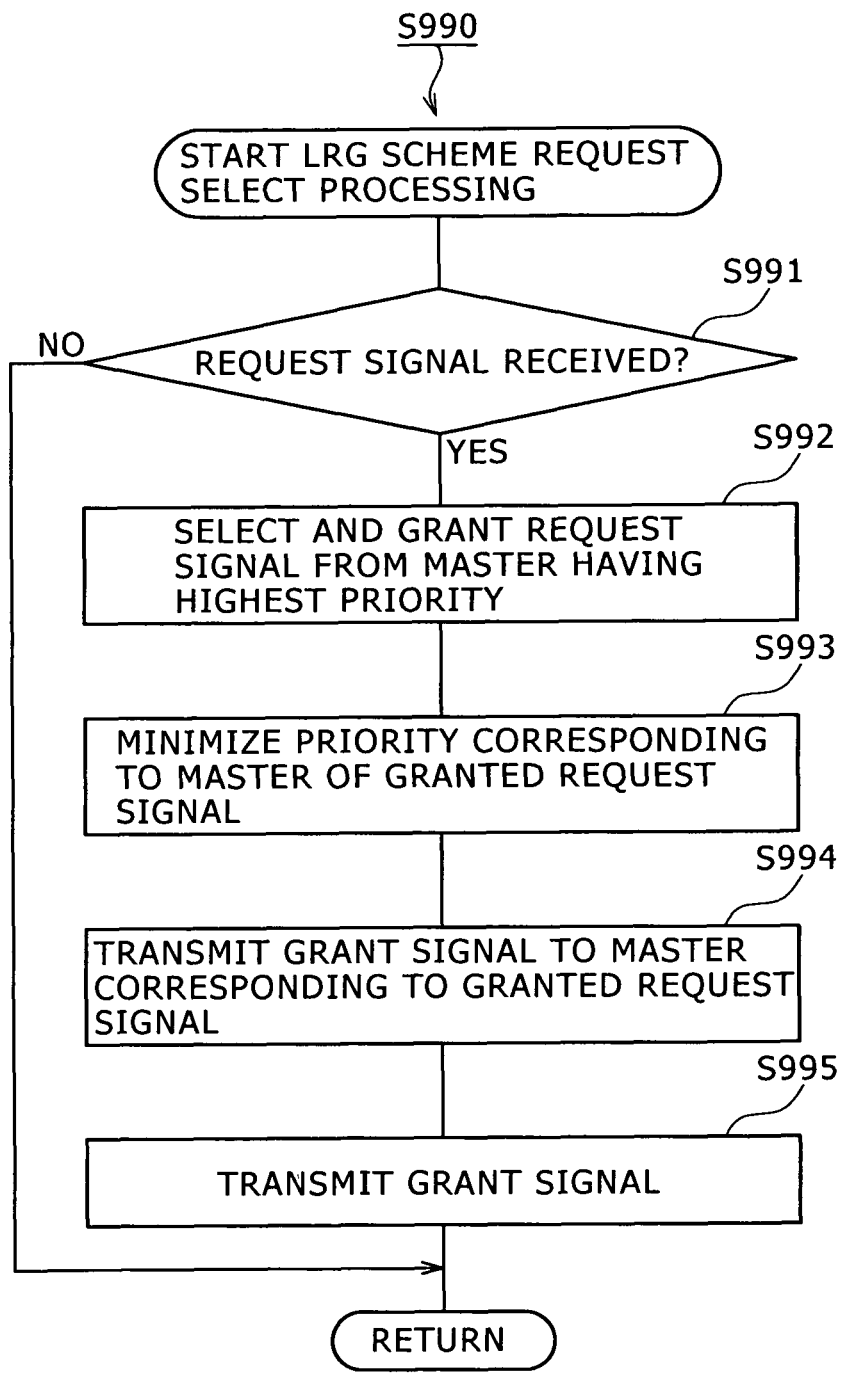
FIG. 17 is a flowchart indicative of exemplary LRG scheme request select processing practiced as the second embodiment of the disclosure.

The following describes operations of the arbitration circuit 401 practiced as the second embodiment of the disclosure with reference to FIG. 16 and FIG. 17.

Referring to FIG. 15, there is shown a flowchart indicative of an exemplary control procedure of the arbitration circuit 401 practiced as the second embodiment of the disclosure. The control procedure of the arbitration circuit 401 of the second embodiment differs from the control procedure of the first embodiment in that LRG scheme selection processing (step S990) is executed instead of the priority scheme request selection processing (step S970).

Referring to FIG. 17, there is shown a flowchart indicative of exemplary LRG scheme selection request processing practiced as the second embodiment of the disclosure. The LRG scheme selection block 451 determines whether at least one request signal has been received from the bandpass filter 430 (step S991).

If request signals are found to have been received (Yes in step S991), then the LRG scheme selection block 451 selects the request signal of the master having the highest priority level from among the received request signals and grants the selected request signal (step S992). Of the priority holding block 452, the LRG scheme selection block 451 sets the priority level of the master corresponding to the granted request signal to the lowest level (step S993). Next, the LRG scheme selection block 451 transmits a grant signal to the master corresponding to the granted request signal (step S994). The LRG scheme selection block 451 notifies the request management section 420 and the bandpass filter 430 of the transmitted grant signal (step S995).

If no request signal has been received (No in step S991) or, after step S996, the LRG filter 450 terminates the LRG scheme selection request processing.

The following describes results of operations of the arbitration circuit 401 practiced as the second embodiment with reference to FIG. 18.

Referring to FIG. 18, there is shown a timing chart indicative of exemplary results of operations of the arbitration circuit 401 practiced as the second embodiment of the disclosure. This example assumes that the number of bus masters and the bandpass and priority level setting values be the same as those of the first embodiment. It is assumed that, in periods T0 through T5, the arbitration circuit 401 have received the same request signals as those in the first embodiment. To be more specific, it is assumed that request signals $3'b111$, $3'b110$, $3'b100$, $3'b100$, $3'b100$, and $3'b000$ have been received.

As with the first embodiment, the request management section 420 receives request signals and, of the received request signals, transmits the request signals not granted to the bandpass filter 430. The bandpass filter 430 determines whether the number of grants in each cycle period is equal to or higher than a predetermined value for each master. If the number of grants is found to be equal to or higher than a predetermined value, the bandpass filter 430 masks the request of that master.

Of the request signals not limited by the bandpass filter 430, the LRG filter 450 selects the request signal of the master having the longest elapsed time from the last transmission of a grant signal and grants the selected request signal. For example, assume that grant signals be transmitted to master #2 and master #1 in this order at clocks before T0. Then, at T0, the LRG filter 450 transmits a grant signal to master #1 and then receives signal $3'b111$ at T1. In this case, the master having the longest elapsed time from having been granted last time is master #2. Hence, the LRG filter 450 outputs signal $3'b010$.

As described above, according to the second embodiment of the disclosure, the LRG filter 450 selects the request signal of the master having the longest elapsed time after the transmission of the last grant signal after the bandpass processing. This novel configuration can grant data transfer also to masters having a long time in which the request signals thereof are not selected, thereby ensuring impartiality between the masters.

Figure 19:
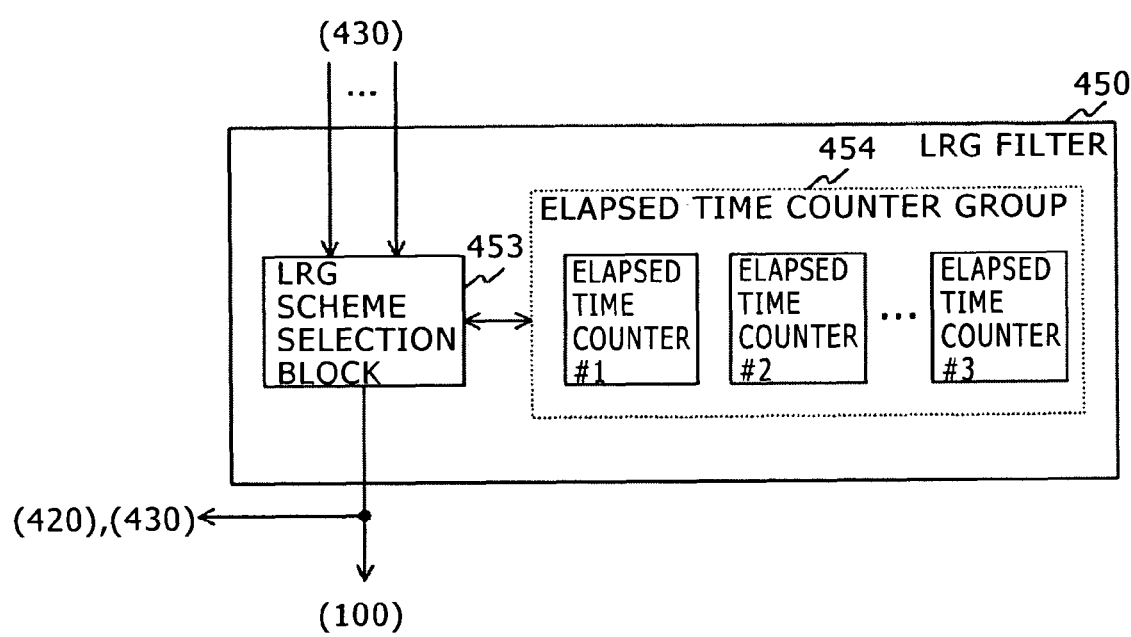
FIG. 19 is a block diagram illustrating an exemplary variation to the LRG filter practiced as the second embodiment of the disclosure.

It should be noted that, in the configuration of the second embodiment of the disclosure, the LRG filter 450 holds the priority levels for all masters and dynamically changes the priority levels on the basis of grant signals. However, it is also practicable to provide a configuration in which a counter for counting an elapsed time is arranged for each master as shown in FIG. 19. FIG. 19 is a block diagram illustrating a variation to an LRG filter 450 in the second embodiment of the disclosure. This LRG filter 450 has an LRG scheme selection block 453 and an elapsed time counter group 454.

The elapsed time counter group 454 has an elapsed time counter for each master. The elapsed time counter counts an elapsed time from the selection made last time.

The LRG scheme selection block 453 operates on a system clock. First, the LRG scheme selection block 453 initializes every counter in the elapsed time counter group 454. Then, the LRG scheme selection block 453 up-counts each elapsed time counter every time one clock cycle passes. If there are any request signals not masked by the bandpass filter 430, the LRG scheme selection block 453 selects the request signal having the highest value of the elapsed time counter from among the unmasked request signals and grants the selected request signal. Then, the LRG scheme selection block 453 initializes the elapsed time counter of the master corresponding to the granted request signal. The LRG scheme selection block 453 transmits the grant signal to the master corresponding to the granted request signal. The LRG scheme selection block 453 notifies the request management section 420 and the bandpass filter 430 of the transmitted grant signal.

(3) The Third Embodiment

Configuration of a Bus Control Apparatus

The following describes the third embodiment of the disclosure with reference to FIG. 20 through FIG. 23. The arbitration circuit practiced as the first embodiment of the disclosure selects a master by the priority method after the bandpass processing. An arbitration circuit practiced as the third embodiment of the disclosure differs from the arbitration of the first embodiment in that a master is selected by the priority scheme and the longest elapsed time scheme after the bandpass processing.

Figure 20:
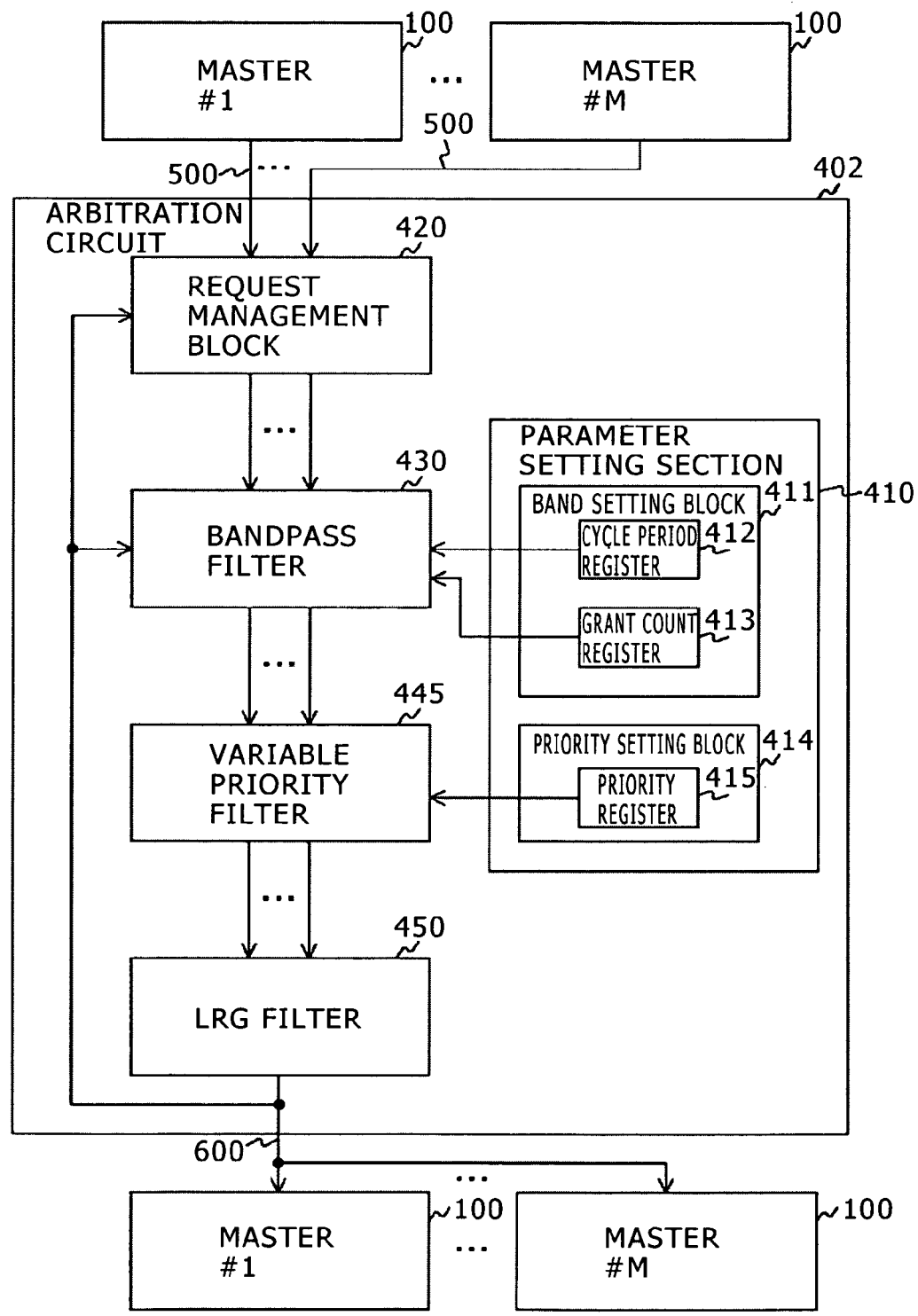
FIG. 20 is a block diagram illustrating an exemplary configuration of an arbitration circuit practiced as a third embodiment of the disclosure.

Referring to FIG. 20, there is shown a block diagram illustrating an exemplary configuration of an arbitration circuit 402 as an example of an arbitration circuit practiced as the third embodiment of the disclosure. The arbitration circuit 402 differs from the arbitration circuit 400 practiced as the first embodiment in that a variable priority filter 445 is arranged instead of the variable priority filter 440 shown in FIG. 2 and an LRG filter 450 is arranged.

The variable priority filter 445 selects a request signal of a master having the highest priority level from among request signals received from a bandpass filter 430.

In the first embodiment, no same priority level is set to two or more masters. By contrast, the second embodiment allows the setting of a same priority levels to two or more masters. This is because, even if two or more request signals have passed the variable priority filter 445, the LRG filter 450 selects the request signal of any master from among these request signals.

In the first embodiment, the variable priority filter 440 notifies the request management section 420 and the bandpass filter 430 of a selected request signal. By contrast, the variable priority filter 445 of the third embodiment does not notify a request management section 420 and a bandpass filter 430 of a selected request signal. This is because the LRG filter 450 of the post-stage, rather than the variable priority filter 440 of the pre-stage, notifies the request management section 420 and the bandpass filter 430 of a grant signal.

It should be noted that the variable priority filter 445 of the third embodiment is one example of the priority selection block. The LRG filter 450 of the third embodiment is one example of the longest elapsed time selection block.

Referring to FIG. 21, there is shown an example of the setting of the priority levels of the masters in the third embodiment of the disclosure. In the first embodiment of the disclosure, no same priority level can be set to two or more masters as shown in FIG. 6 for example. By contrast, the third embodiment assumes that the same priority level can be set to two or more masters. For example, in the third embodiment, levels 0, 1, and 1 are set to masters #1, #2, and #3, respectively, in which masters #2 and #3 have the same priority level 1.

Operations of the Bus Control Apparatus

Figure 22:
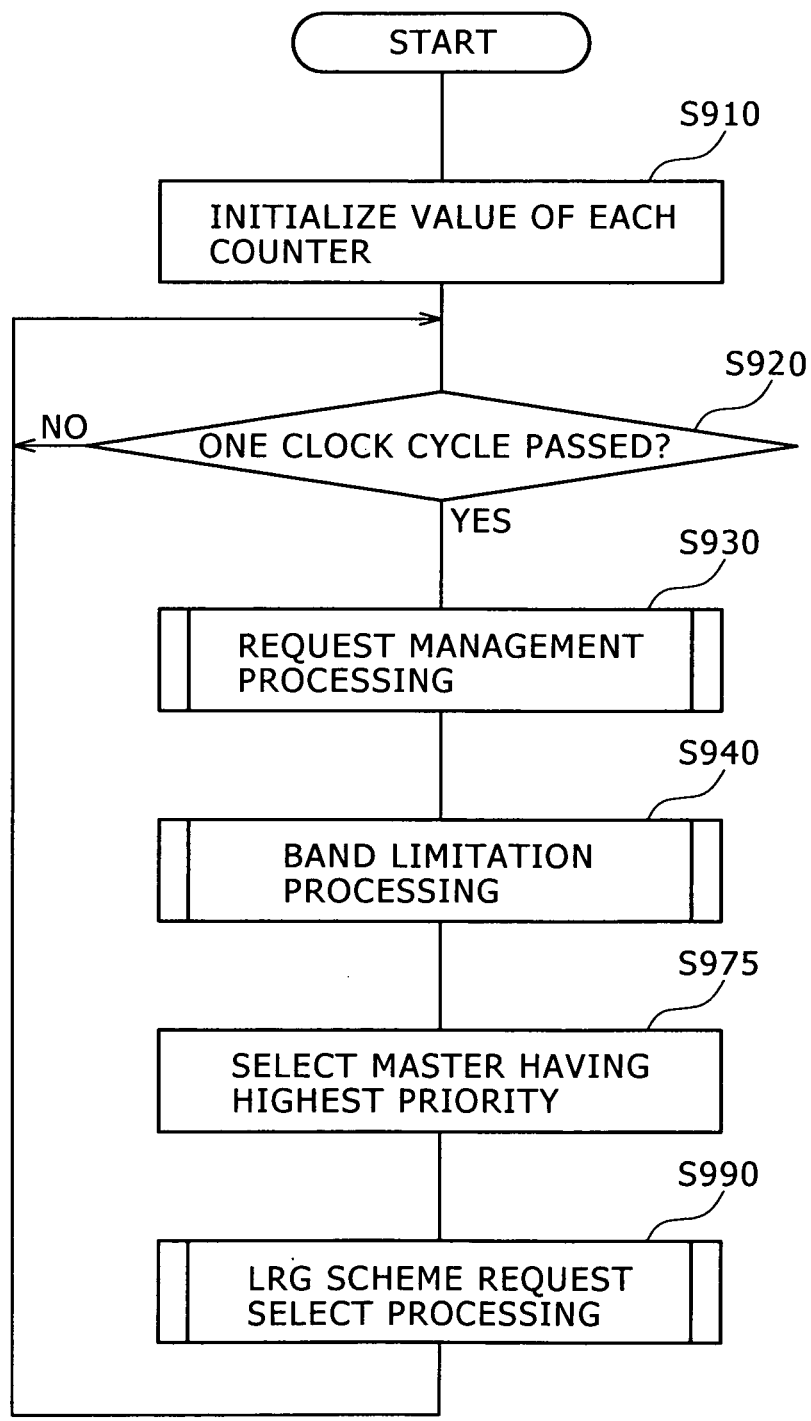
FIG. 22 is a flowchart indicative of an exemplary control procedure of the arbitration circuit practiced as the third embodiment of the disclosure.

The following describes a control procedure to be executed by the arbitration circuit 402 practiced as the third embodiment of the disclosure with reference to FIG. 22.

Referring to FIG. 22, there is shown a flowchart indicative of an exemplary control procedure to be executed by the arbitration circuit 402 practiced as the third embodiment of the disclosure. The control procedure to be executed by the arbitration circuit 402 differs from the control procedure of the first embodiment in that step S975 and step S990 are executed instead of the priority scheme request selection processing (step S970).

After step S970, the variable priority filter 445 selects a request signal of the master having the highest priority level from among the request signals that have passed the bandpass filter 430 (step S975). After step S975, the LRG filter 450 executes LRG scheme request selection processing (step S990). This request scheme selection processing is substantially the same as the LRG scheme request selection processing of the second embodiment.

Referring to FIG. 23, these is shown a timing chart indicative of a result of an operation of the arbitration circuit 402 practiced as the third embodiment of the disclosure. In this example, the number of bus masters is assumed to be only 3 as with the first embodiment. The setting value of the bandpass filter 430 is the same as that of the first embodiment. The setting values of the variable priority filter 445 are assumed to be 0, 1, and 1 for masters #1, #2, and #3, respectively as shown in FIG. 21.

In periods T0 through T5, the arbitration circuit 402 is assumed to have received the substantially the same request signals as those of the first embodiment. To be more specific, it is assumed, as described earlier, that request signals 3'b111, 3'b110, 3'b100, 3'b100, 3'b100, and 3'b000 have been received.

As with the first embodiment, the request management section 420 receives request signals and transmits a request signal not granted from among the received request signals. As with the first embodiment, the bandpass filter 430 also determines whether the number of requests within each cycle period is in excess of the setting value or each master. If the number of requests is found exceeding the setting value, then the bandpass filter 430 masks the request signal of that master.

From among the request signals outputted from the bandpass filter 430, the variable priority filter 445 selects the request signal of the master having the highest priority level. It should be noted, however, that, unlike the first embodiment, the same priority level can be set to two or more masters in the third embodiment. Therefore, the variable priority filter 445 sometimes outputs two or more request signals.

For example, at clock T4, the variable priority filter 445 receives signal 3'b011 from the bandpass filter 430. Because the priority levels of master #2 and master #3 are the same, the variable priority filter 445 outputs signal 3'b011 indicative of two or more request signals.

As with the second embodiment, the LRG filter 450 selects the request of the master having the longest elapsed time from the granting from among the request signals received from the variable priority filter 445.

As described above, according to the third embodiment of the disclosure, the variable priority filter 445 selects request signals by the priority scheme after the bandpass processing and then the LRG filter 450 selects a request signal by the longest elapsed time scheme. This novel configuration allows the arbitration circuit 402 to select selection requests on the basis of preset priority levels and times elapsed from the granting. Consequently, the arbitration circuit 402 can surely select the request of a master having a high priority level and provide the fairness between the masters.

It should be noted that, in the third embodiment, the arbitration circuit 402 is configured so as to change priority levels by updating the priority register 415. Obviously, it is also practicable to fix the values of the priority levels of the masters.

(4) The Fourth Embodiment

Configuration of a Bus Control Apparatus

The following describes the fourth embodiment of the disclosure with reference to FIG. 24 through FIG. 28. In the above-described third embodiment, the arbitration circuit 402 grants a request signal received in a certain clock cycle within that clock cycle. An arbitration circuit 403 practiced as the fourth embodiment differs from the arbitration circuit 402 of the third embodiment in that a request signal received in a certain clock cycle is granted not in that clock cycle but in a next clock cycle.

Figure 24:
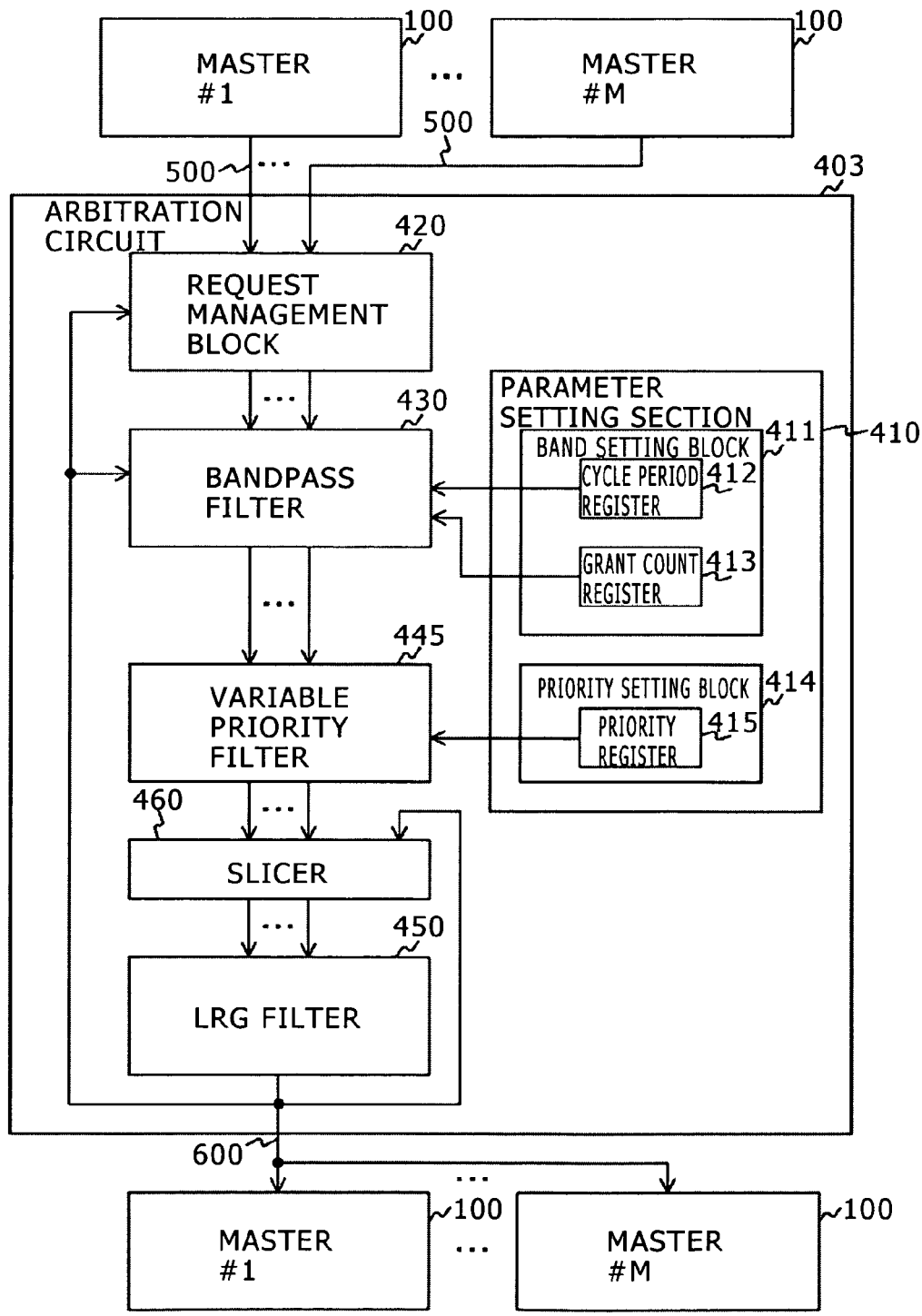
FIG. 24 is a block diagram illustrating an exemplary configuration of an arbitration circuit practiced as a fourth embodiment of the disclosure.

Referring to FIG. 24, there is shown a block diagram illustrating an exemplary configuration of the arbitration circuit 403 as one example of an arbitration circuit practiced as the fourth embodiment of the disclosure. As described before, the arbitration circuit 402 of the third embodiment selects a request signal in each clock cycle and grants the selected signal, thereby decrementing, by one, the number of request signals not granted. This approach requires a certain time from the reception of a request signal to the granting of the selected request signal. Hence, the processing of reducing the number of requests not granted may not terminate with the clock cycle in which request signals have been received. If this happens, the request signals to be deleted from standby request counters in the standby request counter group 422 are not deleted, thereby causing the arbitration circuit 402 to malfunction. In order to circumvent this problem, the third embodiment is configured so as for the arbitration circuit 402 to grant a request signal selected in a certain clock cycle in the clock cycle subsequent thereto, thereby surely deleting the granted request signal.

To be more specific, the arbitration circuit 403 of the fourth embodiment differs from the arbitration circuit 402 of the third embodiment in that an LRG filter 455 is arranged instead of the LRG filter 450. In addition, the arbitration circuit 403 differs from the 402 in that a slicer 460 is arranged between the variable priority filter 445 and the LRG filter 455.

The LRG filter 455 of the fourth embodiment differs from the LRG filter 450 of the third embodiment in that the LRG filter 455 notifies the slicer 460 in addition to the request management section 420 and the bandpass filter 430 of grant signals.

The slicer 460 outputs a part or all of request signals selected by the variable priority filter 445 in a certain clock cycle to the LRG filter 455 in the cycle following that certain clock cycle. To be more specific, the slicer 460 receives the notification of the grant signal transmitted last time from the LRG filter 455. Next, of the request signals selected by the variable priority filter 445, the slicer 460 outputs the request signal of a master other than the master last notified of the grant signal to the LRG filter 455. The reason why no request signal is outputted from the master to which a grant signal was transmitted last will be described later with reference to FIG. 25.

Figure 25:
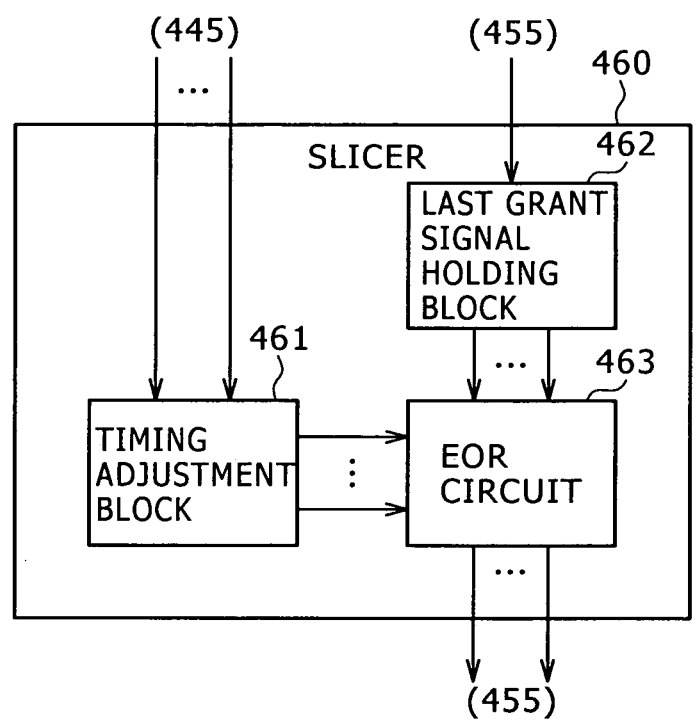
FIG. 25 is a block diagram illustrating an exemplary configuration of a slicer practiced as the fourth embodiment of the disclosure.

Referring to FIG. 25, there is shown a block diagram illustrating an exemplary configuration of the slicer 460. The slicer 460 has a timing adjustment block 461, a last-time grant signal hold block 462, and an EOR circuit 463.

The timing adjustment block 461 holds a request signal by use of FIFO (First In First Out) scheme to adjust a timing with which the slicer 460 outputs the request signal. To be more specific, when a request signal is selected from the variable priority filter 445, the timing adjustment block 461 gets the request signal held by the timing adjustment block 461 in the last clock cycle. Next, the timing adjustment block 461 holds the request signal selected in the current clock cycle.

The last-time grant signal hold block 462 holds a grant signal notified of from the LRG filter 455. Every time the last-time grant signal hold block 462 receives a request signal from the LRG filter 455, the last-time grant signal hold block 462 updates the grant signal held therein by the grant signal received this time. The last-time grant signal hold block 462 holds the transmitted grant signal as a bit train indicative, for each master, of whether the grant signal has been transmitted or not.

From among the request signals obtained by the timing adjustment block 461, the EOR circuit 463 outputs, to the LRG filter 455, a request signal of a master other than the master of the request signal granted last time. To be more specific, the EOR circuit 463 receives a bit train indicative of the presence or absence of a request signal of each master from the timing adjustment block 461. In addition, the EOR circuit 463 reads, from the last-time grant signal hold block 462, a bit train indicative of whether a grant signal has been transmitted the last time for each master. The EOR circuit 463 executes an exclusive OR operation between the received bit train and the read bit train and outputs an obtained exclusive OR value to the LRG filter 455.

As described above, separate from the request management section 420, the timing adjustment block 461 holds request signals selected last time. In the request signals held in the timing adjustment block 461, the same signal as those deleted by the request management section 420 may be included because of the grating last time. Hence, unless the request signals of the same master as of the request signals granted last time are not deleted in advance, the request signals deleted by the request management section 420 may be granted. If this happens, the arbitration circuit 403 grants one request signal two times, thereby possibly causing an erroneous operation. Consequently, in order to prevent this problem from occurring, the fourth embodiment is configured such that the slicer 460 does not output any request signals of the same master as those granted last time.

It should be noted that the slicer 460 of the fourth embodiment is one example of the adjustment block.

Operations of the Bus Control Apparatus

Figure 26:
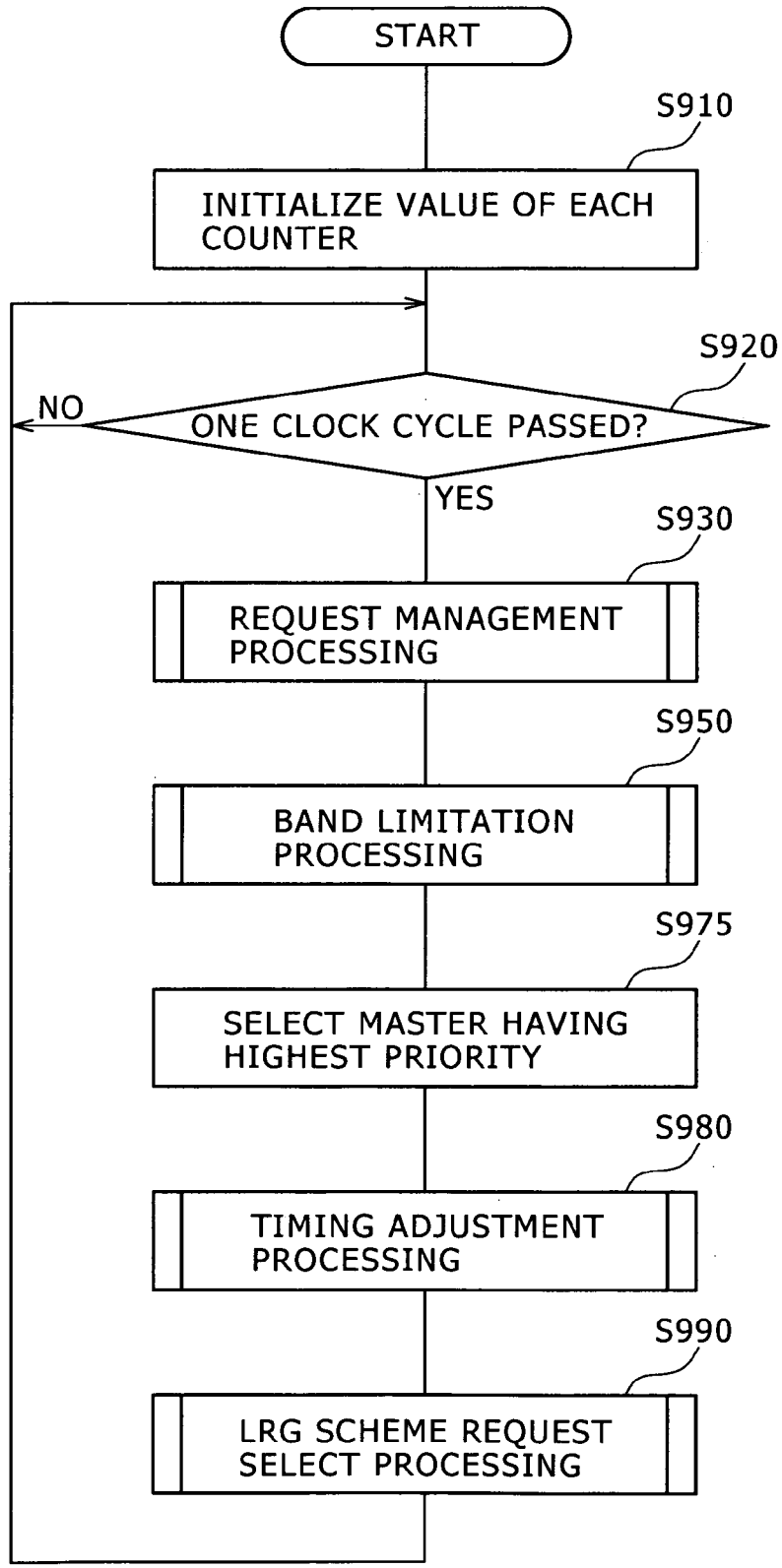
FIG. 26 is a flowchart indicative of an exemplary control procedure of the arbitration circuit practiced as the fourth embodiment of the disclosure.
Figure 27:
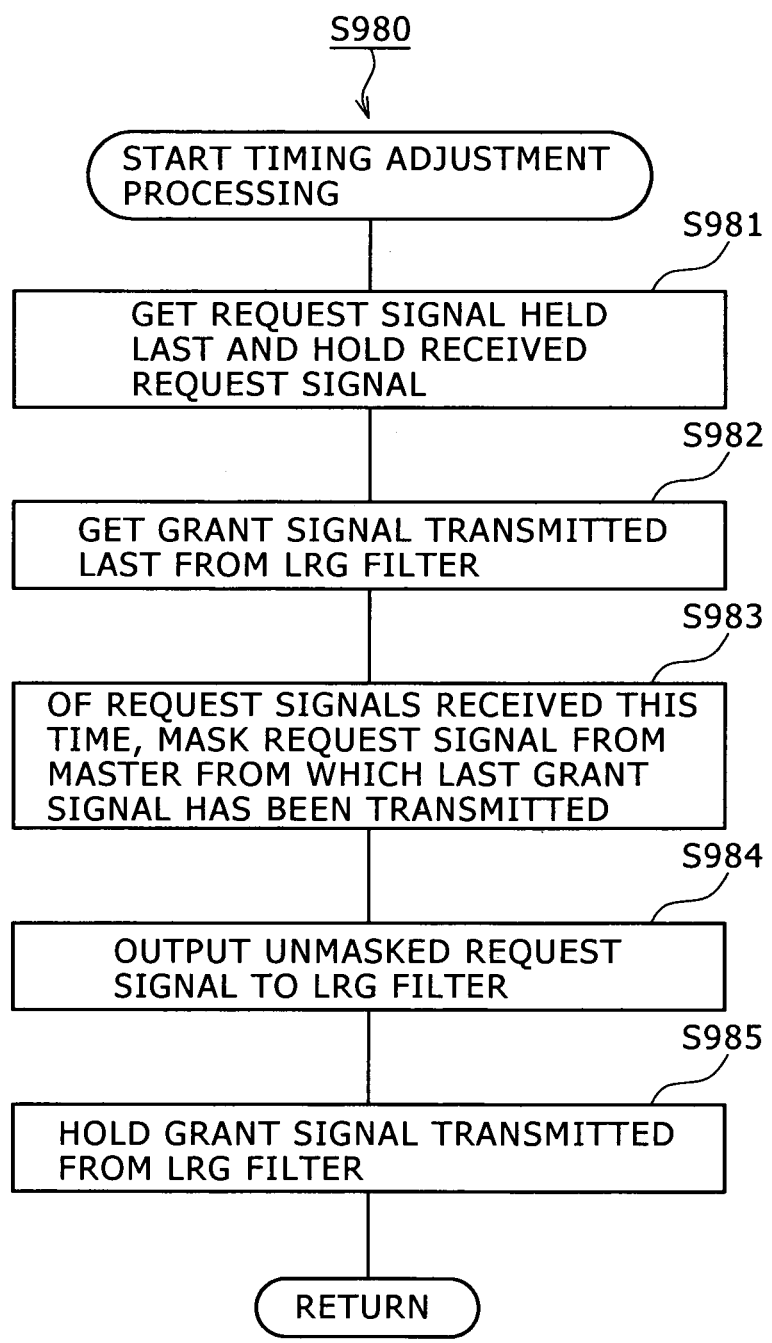
FIG. 27 is a flowchart indicative of an exemplary timing adjustment processing practiced as the fourth embodiment of the disclosure.

The following describes a control procedure to be executed by the arbitration circuit 403 practiced as the fourth embodiment of the disclosure with reference to FIG. 26 and FIG. 27.

Referring to FIG. 26, there is shown a flowchart indicative of the control procedure to be executed by the arbitration circuit 403 practiced as the fourth embodiment of the disclosure. The control procedure of the fourth embodiment differs from the above-described control procedure of the third embodiment in that timing adjustment processing (step S980) for adjusting the timing of granting a request signal is further executed after step S975.

Referring to FIG. 27, there is shown a flowchart indicative of one example of timing adjustment processing of the fourth embodiment of the disclosure. The timing adjustment block 461 gets a request signal held last time and holds a request signal received this time (step S981).

The EOR circuit 463 reads and gets a grant signal transmitted last time from the LRG filter 455 from the last-time grant signal hold block 462 (step S982). Of the request signals received this time, the EOR circuit 463 masks the request signal from the master to which the grant signal has been transmitted last time (step S983). The EOR circuit 463 outputs the unmasked request signals to the LRG filter 455 (step S984).

The last-time grant signal hold block 462 holds the grant signal notified of from the LRG filter 455 (step S985).

Referring to FIG. 28, there is shown a timing chart indicative of an exemplary result of an operation of the arbitration circuit 403 practiced as the fourth embodiment of the disclosure. In this example, the number of bus masters and the setting values of the bandpass filter 430 and the variable priority filter 445 are assumed to be the same as those of the third embodiment.

In periods T0 through T5, the arbitration circuit 403 is assumed to have received the substantially the same request signals as those of the first embodiment. To be more specific, it is assumed, as mentioned before, that request signals 3'b111, 3'b110, 3'b100, 3'b100, 3'b100, and 3'b000 have been received.

As with the first embodiment, the request management section 420 receives request signals and transmits a request signal not granted from among the received request signals. As with the first embodiment, the bandpass filter 430 also determines whether the number of requests within each cycle period is in excess of the setting value for each master. If the number of requests is found exceeding the setting value, then the bandpass filter 430 masks the request signal of that master.

As with the third embodiment, the variable priority filter 445 selects the request signal of the master having the highest priority level from among the request signals outputted from the bandpass filter 430.

The slicer 460 holds the request signal selected by the variable priority filter 445 and outputs this request signal in the cycle following the clock cycle in which the request signal has been selected. For example, at clock T0, the slicer 460 receives signal 3'b100 from the variable priority filter 445. Next, the slicer 460 outputs the received signal at clock T1 following clock T0.

In addition, the slicer 460 outputs only the request signals from a master other than the master corresponding to a request signal granted last time. For example, at clock T1, a request signal of master #1 is granted by the LRG filter 455. At clock T2, the slicer 460 receives signal 3'b100 from the variable priority filter 445. In this case, the slicer 460 masks the request signal from master #1 granted last time and outputs signal 3'b000.

As described above, according to the fourth embodiment of the disclosure, arbitration circuit 403 grants a request signal selected in a certain clock cycle in a cycle following this certain clock cycle. This novel configuration allows, when a request signal is selected in a certain clock cycle for granting, the arbitration circuit 403 eliminate the necessity of deleting the request signal granted in that certain clock cycle. This configuration can prevent an erroneous operation from happening due to that a request signal granted in a certain clock cycle is not deleted.

In addition, the arbitration circuit 403 does not grant any request signals from the master to which a grant signal has been transmitted last time. This novel configuration can prevent the same signal as a request signal deleted by the request management section 420 from being granted by the LRG filter 455 again.

In the fourth embodiment, the arbitration circuit 403 is configured such that a request signal is granted at a clock following a clock at which the request signal has been selected by priority level. It should be noted that the arbitration circuit 403 may be configuration such that, two or more clocks after the selection of a request signal, this request signal is grated.

In the forth embodiment, the slicer 460 is arranged between the variable priority filter 445 and the LRG filter 455 in the arbitration circuit 403. It is also practicable to arrange the slicer 460 before or after any one of the filters if a request signal can be granted a predetermined elapsed time after the reception of the request signal. For example, the slicer 460 may be arranged between the bandpass filter 430 and the variable priority filter 445.

(5) The Fifth Embodiment

Configuration of a Bus Control Apparatus

The following describes a fifth embodiment of the disclosure with reference to FIG. 29 through FIG. 32. An arbitration circuit practiced as the fifth embodiment of the disclosure differs from the arbitration circuit of the first embodiment in that a cycle period and a maximum number of grants are set in bandpass processing in the first embodiment, while only a cycle period is set in the fifth embodiment.

Figure 29:
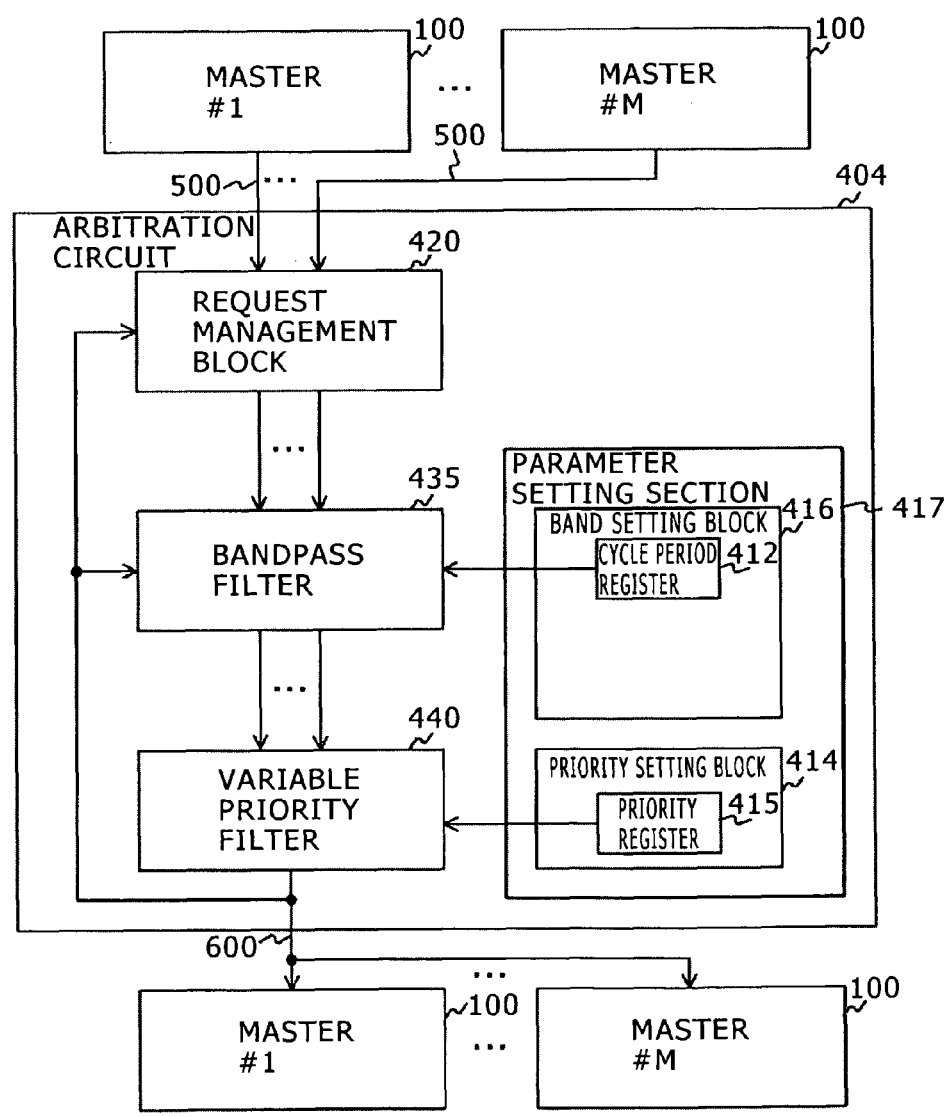
FIG. 29 is a block diagram illustrating an exemplary configuration of an arbitration circuit practiced as a fifth embodiment of the disclosure.

Referring to FIG. 29, there is shown a block diagram illustrating an exemplary configuration of an arbitration circuit 404 as one example of the arbitration circuit practiced as the fifth embodiment of the disclosure. The arbitration circuit 404 differs from the arbitration circuit 400 practiced as the first embodiment in that a parameter setting section 417 is arranged instead of the parameter setting section 410 shown in FIG. 2 and a bandpass filter 435 is arranged instead of the bandpass filter 430 shown in FIG. 2. The parameter setting section 417 differs from the parameter setting section 410 of the first embodiment in that a band setting block 416 is arranged instead of the band setting block 411 shown in FIG. 2. The parameter setting section 416 differs from the band setting block 411 of the first embodiment in that the grant count register 413 shown in FIG. 2 is not arranged.

The bandpass filter 435 counts the interval of grant signals for each master and, if the counted interval is below a setting value, masks the request signals of that master.

Figures 30, 31:
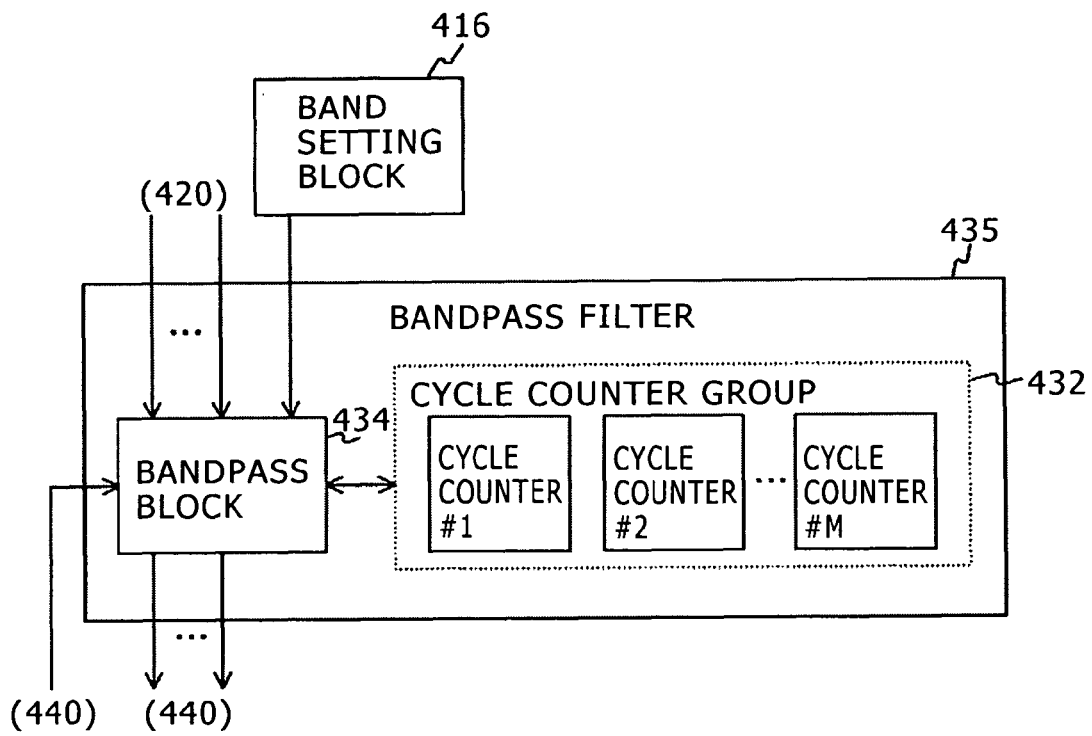
FIG. 30 is a block diagram illustrating an exemplary configuration of a bandpass filter practiced as the fifth embodiment of the disclosure.
FIG. 31 is a diagram illustrating a setting example of the bandpass filter practiced as the fifth embodiment of the disclosure.

Referring to FIG. 30, there is shown a block diagram illustrating an exemplary configuration of the bandpass filter 435 as one example of a bandpass block practiced as the fifth embodiment of the disclosure. The bandpass filter 435 differs from the bandpass filter 430 of the first embodiment in that a band pass block 434 is arranged instead of the bandpass block 431 shown in FIG. 2 and the in-cycle grant counter group 433 shown in FIG. 2 is not arranged.

The bandpass block 434 limits request signals such that the interval of grant signals becomes equal to or higher than a setting value. To be more specific, the bandpass block 434 increments, by one, the value of each cycle counter in the cycle counter group 432 every time one clock cycle passes. Then, of the cycle counter group 432, if the value of the cycle counter of any one of the masters is lower than the cycle period, the bandpass block 434 masks the request signal of that master. In addition, the bandpass block 434 receives the notification of a grant signal from the variable priority filter 440. Of the cycle counter group 432, the bandpass block 434 initializes the value of the cycle counter of the master corresponding to the notified grant signal.

Referring to FIG. 31, there is shown exemplary settings of cycle periods as request intervals of the fifth embodiment of the disclosure. Grant intervals are set by the number of clock cycles at least to be provided between grant signals. For example, assume that request intervals 2, 1, and 0 be set to masters #1, #2, and #3, respectively. In this case, if a grant signal is transmitted to master #1 in a certain clock cycle, the bandpass filter 435 limits the request signal from master #1 until two clocks passes from that clock. Also, because the request interval for master #3 is 0, the bandpass filter 435 does not limit the request signal from master #3 in any clock cycles.

Operations of the Bus Control Apparatus

Figure 32:
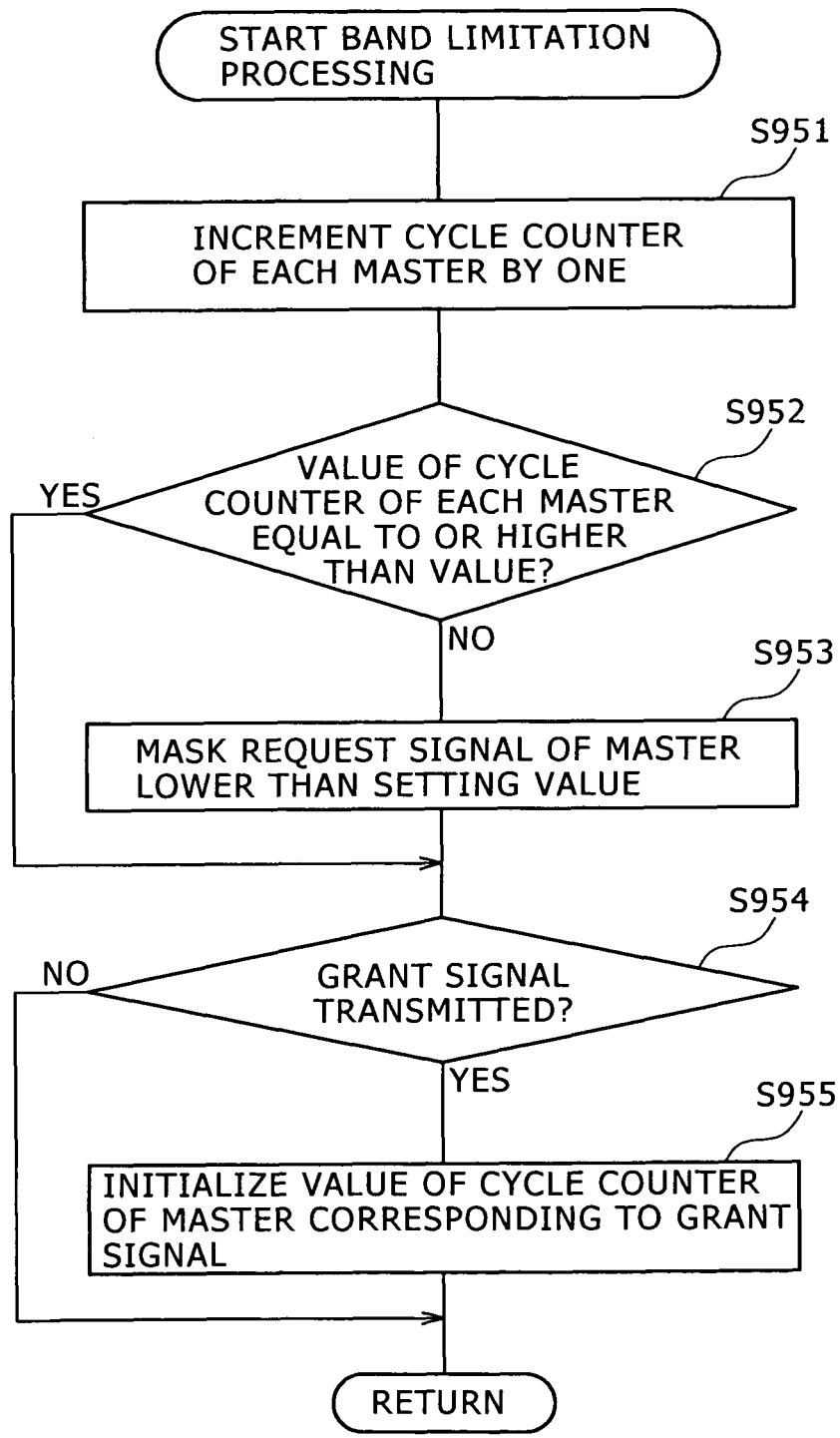
FIG. 32 is a flowchart indicative of exemplary band limit processing practiced as the fifth embodiment of the disclosure.

Referring to FIG. 32, there is shown a flowchart indicative of exemplary bandpass processing of the fifth embodiment of the disclosure. The bandpass block 434 increments, by one, the value of the cycle counter of each master in the cycle counter group 432 (step S951). The bandpass block 434 determines whether the value of each master in the cycle counter group 432 is in excess of the setting value or not (step S952). If the value of the cycle counter in each master is found to be below the setting value (No in step S952), then the bandpass block 434 masks the request signal of the master of which cycle counter value is below the setting value among the received request signals (step S953).

If the values of the cycle counts of all masters are found to be in excess of the setting value (Yes in step S952) or after step S953, the bandpass block 434 determines whether the notification of a grant signal has been received from the variable priority filter 440 or not (step S954). If the notification of a grant signal is found to have been received (Yes in step S954), then the bandpass block 434 initializes the value of the cycle counter of the master corresponding to that grant signal among the cycle counter group 432 (step S956).

If the notification of a grant signal is found not have been received (No in step S954) or after step S954, the bandpass block 434 terminates the bandpass processing.

As described above and according to the fifth embodiment of the disclosure, by setting a cycle period in advance, the bandpass block 434 limits request signals such that the interval of grant signals becomes longer than the cycle period. This novel configuration allows the bandpass block 434 to execute bandpass processing only by setting a cycle period. In addition, as shown in FIG. 30, this configuration uses less counters to be arranged in the bandpass filter as compared with the case where both a cycle period and a maximum number of grants are set.

It should be noted that the above-described embodiments of the disclosure are only examples and the items of the embodiments of the disclosure are respectively correlated with the disclosure identifying items. Likewise, the disclosure identifying items cited in the scope of claims are respectively correlated with the items in the embodiments of the disclosure that have the same names as those of the disclosure identifying items. While preferred embodiments of the present disclosure have been described using specific terms, such description is for illustrative purpose only, and it is to be understood that changes and variations may be made without departing from the spirit or scope of the following claims.

It should also be noted that the processing procedures described in the description of the embodiments of the disclosure may be interpreted as methods having a sequence of these processing procedures or a program for causing a computer to execute a sequence of these processing procedures or a recording media that stores such a program. This recording media may include a CD (Compact Disc), an MD (Mini Disc), a DVD (Digital Versatile Disk), a memory card, a Blu-ray Disc (trademark), or the like.

The present disclosure contains subject matter related to that disclosed in Japanese Priority Patent Application JP 2010-249253 filed in the Japan Patent Office on Nov. 8, 2010, the entire content of which is hereby incorporated by reference.

What is claimed is:

1. An arbitration circuit comprising:
one or more processors operable to:
receive one or more non-granted bus request signals when each of one or more bus request signals from one or more bus masters had not previously initiated a transmission of a grant signal;
generate an unmasked bus request signal corresponding to one of said one or more non-granted bus request signals when a number of unmasked bus request signals, counted by a counter, granted corresponding to one of said one or more bus masters is less than a setting value, wherein said one of said one or more non-granted bus request signals corresponds to one of said one or more bus request signals from said one of said one or more bus masters;
generate and transmit another grant signal upon receipt of said unmasked bus request signal, said another grant signal authorizing said one of said one or more bus masters to control a data bus; and
initialize, after a preset cycle period corresponding to said one of said one or more bus masters, a count value of said counter that counts said number of granted unmasked bus request signals corresponding to said one of said one or more bus masters.

2. The arbitration circuit according to claim 1, wherein said one or more bus request signals are requests for control of said data bus.

3. The arbitration circuit according to claim 1, wherein said one or more bus masters are configured to output said one or more bus request signals.

4. The arbitration circuit according to claim 1, wherein said setting value is a maximum number of said granted unmasked bus request signals permissible to said one of said one or more bus masters during said preset cycle period, each of said granted unmasked bus request signals authorizing said one of said one or more bus masters to control said data bus.

5. The arbitration circuit according to claim 4, wherein said preset cycle period is a period for which said bus request signals from said one of said one or more bus masters are monitored.

6. The arbitration circuit according to claim 1, wherein said another grant signal is generated based on a priority level of said one of said one or more bus masters before reduction of said priority level.

7. The arbitration circuit according to claim 1, wherein said one or more processors are operable to generate said another grant signal corresponding to said unmasked bus request signal when a priority level of said one of said one or more bus masters before reduction is higher than priority levels for other of said one or more bus masters.

8. The arbitration circuit according to claim 1, wherein said one or more processors are operable to generate said another grant signal corresponding to said unmasked bus request signal when an elapsed time from said transmission of said grant signal for said one of said one or more bus masters is more than that for other of said one or more bus masters.

9. The arbitration circuit according to claim 1, wherein said setting value is for at least one clock cycle.

10. The arbitration circuit according to claim 1, wherein said one or more processors are operable to:
receive said one or more bus request signals; and
determine a count of standby bus request signals corresponding to each of said one or more bus masters based on a number of said received one or more bus request signals and a number of occurrences of said granted unmasked bus request signals,
wherein said one or more non-granted bus request signals corresponds to said one or more bus request signals that are not granted.

11. An arbitration circuit comprising:
one or more processors operable to:
> receive a plurality of non-granted bus request signals when each of a plurality of bus request signals from a plurality of bus masters had not previously initiated a transmission of a grant signal; and
>
> generate a plurality of unmasked bus request signals corresponding to said plurality of non-granted bus request signals based on a number of unmasked bus request signals granted for each of said plurality of bus masters during a corresponding cycle period set for each of said plurality of bus masters is less than an associated setting value;
>
> mask, after holding a selected set of unmasked bus request signals from said plurality of unmasked bus request signals for one clock cycle, one of said selected set of unmasked bus request signals from one of said plurality of bus masters, wherein said one of said plurality of bus masters generated a bus request signal that initiated the last grant signal; and
>
> generate and transmit another grant signal upon receipt of said held selected set of unmasked bus request signals except said masked one of said selected set of unmasked bus request signals, said another grant signal authorizing another of said plurality of bus masters to control a data bus.

12. The arbitration circuit according to claim 11, wherein bus masters of said selected set of unmasked bus request signals have priority levels higher than that for other bus masters of said plurality of unmasked bus request signals.

13. The arbitration circuit according to claim 11, wherein said another of said plurality of bus masters has an elapsed time from transmission of a previous grant signal more than that for remaining bus masters of said selected set of unmasked bus request signals.

14. An arbitration circuit comprising:
one or more processors operable to:
> receive a non-granted bus request signal when a bus request signal from a bus master had not previously initiated a transmission of a grant signal;
>
> count a number of clock cycles from a clock cycle at which a previous grant signal is transmitted to said bus master;
>
> generate an unmasked bus request signal corresponding to said non-granted bus request signal when said number of counted clock cycles is equal to or greater than a predetermined number of clock cycles; and
>
> generate and transmit another grant signal upon receipt of said unmasked bus request signal, said another grant signal authorizing said bus master to control a data bus.

* * * * *